United States Patent
King

(10) Patent No.: US 12,370,440 B2
(45) Date of Patent: Jul. 29, 2025

(54) MAGNETIC SLIDING CONTROLLER ACCESSORY FOR MOBILE PHONE GAMING

(71) Applicant: OhSnap Gaming LLC, Apex, NC (US)

(72) Inventor: Joshua King, Fredericksburg, VA (US)

(73) Assignee: OhSnap Gaming LLC, Apex, NC (US)

( * ) Notice: Subject to any disclaimer, the term of this patent is extended or adjusted under 35 U.S.C. 154(b) by 0 days.

(21) Appl. No.: 18/651,754

(22) Filed: May 1, 2024

(65) Prior Publication Data
US 2025/0177852 A1 Jun. 5, 2025

Related U.S. Application Data

(60) Provisional application No. 63/605,190, filed on Dec. 1, 2023.

(51) Int. Cl.
| | |
|---|---|
| H04M 1/00 | (2006.01) |
| A63F 13/24 | (2014.01) |
| A63F 13/98 | (2014.01) |
| H02J 7/00 | (2006.01) |
| H02J 50/12 | (2016.01) |
| H02J 50/90 | (2016.01) |
| H04M 1/724 | (2021.01) |

(52) U.S. Cl.
CPC .............. *A63F 13/24* (2014.09); *A63F 13/98* (2014.09); *H02J 7/0042* (2013.01); *H02J 50/12* (2016.02); *H02J 50/90* (2016.02); *H04M 1/724* (2021.01); *H02J 2207/30* (2020.01)

(58) Field of Classification Search
None
See application file for complete search history.

(56) References Cited

U.S. PATENT DOCUMENTS

| | | | |
|---|---|---|---|
| 6,665,173 B2 * | 12/2003 | Brandenberg | H04M 1/0214 345/905 |
| 6,795,304 B1 | 9/2004 | Lam | |
| D500,319 S | 12/2004 | Wada | |

(Continued)

FOREIGN PATENT DOCUMENTS

| | | |
|---|---|---|
| CN | 102117645 A | 7/2011 |
| CN | 102198327 A | 9/2011 |

(Continued)

*Primary Examiner* — Sunit Pandya
(74) *Attorney, Agent, or Firm* — Baker Botts L.L.P.

(57) ABSTRACT

A portable controller accessory that is usable in various states is disclosed. The controller accessory may have an idle (closed) state where the upper case element is closed relative to the lower case element. The controller may have an active (open) state wherein the lower case element is partially slid out from the upper case element to expose the controller's control elements for gaming and place the control elements in a location suitable for a user's hands/fingers to operate the control elements during gaming. Additionally, the controller can be placed in a detached state where the upper and lower case elements are completely detached from one another. In the detached state, the lower case element with its gaming controls can be used with another gaming system, or it can be used with the phone at a distance from the controller.

28 Claims, 25 Drawing Sheets

(56) References Cited

U.S. PATENT DOCUMENTS

| | | | |
|---|---|---|---|
| D524,809 S * | 7/2006 | Alcouloumre | D14/341 |
| 7,386,332 B2 * | 6/2008 | Masuda | H04M 1/0245 |
| | | | 361/679.48 |
| D578,987 S * | 10/2008 | Lee | D14/138 G |
| 7,612,997 B1 | 11/2009 | Diebel et al. | |
| 8,284,554 B2 * | 10/2012 | Stone | G06F 1/1618 |
| | | | 345/169 |
| 8,687,376 B2 * | 4/2014 | Travis | G06F 1/1622 |
| | | | 361/728 |
| D720,342 S | 12/2014 | Starrett et al. | |
| 9,081,545 B1 | 7/2015 | Lin et al. | |
| 9,138,640 B2 | 9/2015 | Baum et al. | |
| 9,674,336 B2 * | 6/2017 | Yaghmour | G06F 1/1669 |
| 9,895,606 B1 | 2/2018 | Kamata et al. | |
| 9,914,060 B1 | 3/2018 | Corigliano | |
| 10,560,558 B1 | 2/2020 | Kosa | |
| D884,799 S | 5/2020 | Buller | |
| 10,776,184 B2 * | 9/2020 | Liu | G06F 1/1658 |
| D953,435 S | 5/2022 | Hu | |
| 11,325,027 B1 | 5/2022 | Lu et al. | |
| D964,464 S | 9/2022 | Hu | |
| D968,514 S | 11/2022 | Hu | |
| 11,509,754 B1 | 11/2022 | Kess, Jr. | |
| D1,021,886 S | 4/2024 | Tong | |
| 2002/0102946 A1 | 8/2002 | Sangiovanni | |
| 2002/0155890 A1 | 10/2002 | Ha et al. | |
| 2003/0202656 A1 | 10/2003 | Ikeuchi et al. | |
| 2004/0137983 A1 * | 7/2004 | Kerr | A63F 13/28 |
| | | | 463/29 |
| 2005/0078086 A1 | 4/2005 | Grams et al. | |
| 2006/0025176 A1 | 2/2006 | Llamas et al. | |
| 2006/0252537 A1 | 11/2006 | Wu | |
| 2007/0052177 A1 | 3/2007 | Ikeda et al. | |
| 2007/0123309 A1 | 5/2007 | Sano et al. | |
| 2007/0293316 A1 | 12/2007 | Meyer | |
| 2008/0004004 A1 | 1/2008 | Wu et al. | |
| 2008/0198136 A1 * | 8/2008 | Cheng | G06F 1/1624 |
| | | | 345/173 |
| 2008/0268901 A1 | 10/2008 | Miramontes | |
| 2009/0051666 A1 | 2/2009 | Choi et al. | |
| 2009/0111508 A1 * | 4/2009 | Yeh | H04M 1/0256 |
| | | | 455/575.8 |
| 2009/0215495 A1 | 8/2009 | Fahlgren et al. | |
| 2010/0081505 A1 | 4/2010 | Alten et al. | |
| 2010/0277415 A1 | 11/2010 | Shanmugam et al. | |
| 2011/0039608 A1 | 2/2011 | Hsiao | |
| 2011/0188222 A1 * | 8/2011 | Wu | G06F 1/1624 |
| | | | 361/807 |
| 2011/0230178 A1 * | 9/2011 | Jones | H04M 1/0241 |
| | | | 455/566 |
| 2011/0260969 A1 | 10/2011 | Workman | |
| 2012/0108335 A1 | 5/2012 | Liotta et al. | |
| 2013/0058659 A1 | 3/2013 | Umezu et al. | |
| 2013/0069499 A1 | 3/2013 | Modrell | |
| 2013/0076781 A1 | 3/2013 | Sirpal et al. | |
| 2013/0095925 A1 | 4/2013 | Xu | |
| 2013/0154542 A1 | 6/2013 | Joynes et al. | |
| 2013/0169509 A1 | 7/2013 | Chen et al. | |
| 2013/0183899 A1 * | 7/2013 | Gorsev | G06F 1/1683 |
| | | | 455/41.1 |
| 2013/0184077 A1 | 7/2013 | Galpern | |
| 2013/0341214 A1 | 12/2013 | King et al. | |
| 2014/0016258 A1 * | 1/2014 | Jeong | G06F 1/1632 |
| | | | 361/679.26 |
| 2014/0034521 A1 * | 2/2014 | Liu | A45C 11/00 |
| | | | 206/45.23 |
| 2014/0035834 A1 | 2/2014 | Sharma et al. | |
| 2014/0206451 A1 | 7/2014 | Helmes et al. | |
| 2014/0274394 A1 | 9/2014 | Willis | |
| 2014/0364231 A1 | 12/2014 | Cramer et al. | |
| 2014/0364232 A1 | 12/2014 | Cramer et al. | |
| 2015/0018101 A1 | 1/2015 | Schoenith et al. | |
| 2015/0031452 A1 | 1/2015 | Rundell et al. | |
| 2015/0273325 A1 | 10/2015 | Falc et al. | |
| 2015/0281422 A1 | 10/2015 | Kessler et al. | |
| 2016/0107082 A1 | 4/2016 | Song et al. | |
| 2016/0147359 A1 | 5/2016 | Helmes et al. | |
| 2016/0361627 A1 | 12/2016 | Fujita et al. | |
| 2017/0056762 A1 | 3/2017 | Gafni | |
| 2017/0168593 A1 | 6/2017 | Kwak et al. | |
| 2017/0252646 A1 | 9/2017 | Bush et al. | |
| 2017/0325321 A1 | 11/2017 | Jorgensen et al. | |
| 2017/0361223 A1 | 12/2017 | Gohara et al. | |
| 2018/0004477 A1 | 1/2018 | Jang et al. | |
| 2018/0099218 A1 | 4/2018 | Ikuta et al. | |
| 2018/0345130 A1 | 12/2018 | Wells et al. | |
| 2018/0345132 A1 | 12/2018 | Kurihara et al. | |
| 2019/0030423 A1 | 1/2019 | Onozawa et al. | |
| 2019/0182371 A1 | 6/2019 | Ashall et al. | |
| 2019/0262702 A1 | 8/2019 | Fujita et al. | |
| 2019/0358534 A1 | 11/2019 | Fang et al. | |
| 2020/0078670 A1 | 3/2020 | Oh et al. | |
| 2020/0155928 A1 | 5/2020 | Guo | |
| 2021/0187388 A1 | 6/2021 | Johnson | |
| 2021/0205699 A1 | 7/2021 | Chung et al. | |
| 2021/0275907 A1 | 9/2021 | Khaira et al. | |
| 2021/0308566 A1 | 10/2021 | Kong et al. | |
| 2021/0344786 A1 | 11/2021 | Takura et al. | |
| 2021/0346794 A1 | 11/2021 | Gao et al. | |
| 2021/0360101 A1 | 11/2021 | Choi et al. | |
| 2021/0370164 A1 | 12/2021 | Lu et al. | |
| 2021/0394048 A1 | 12/2021 | Eichinger et al. | |
| 2022/0062755 A1 | 3/2022 | Lu et al. | |
| 2022/0080300 A1 | 3/2022 | Lu et al. | |
| 2022/0096923 A1 | 3/2022 | O'leary et al. | |
| 2022/0201450 A1 | 6/2022 | Lu et al. | |
| 2023/0086673 A1 | 3/2023 | Lu et al. | |
| 2023/0105605 A1 | 4/2023 | Lu et al. | |
| 2023/0182006 A1 | 6/2023 | Hu et al. | |
| 2023/0233929 A1 | 7/2023 | Bosch et al. | |
| 2023/0283701 A1 | 9/2023 | Bertin et al. | |

FOREIGN PATENT DOCUMENTS

| | | |
|---|---|---|
| CN | 103025087 A | 4/2013 |
| CN | 104383683 A | 3/2015 |
| CN | 204362114 U | 5/2015 |
| CN | 104801047 A | 7/2015 |
| CN | 105056526 A | 11/2015 |
| CN | 204952236 U | 1/2016 |
| CN | 206461684 U | 9/2017 |
| CN | 107648850 A | 2/2018 |
| CN | 207010743 U | 2/2018 |
| CN | 207371096 U | 5/2018 |
| CN | 108600447 A | 9/2018 |
| CN | 108616621 A | 10/2018 |
| CN | 113171603 A | 7/2021 |
| GB | 2502357 A | 11/2013 |
| JP | 2009267490 A | 11/2009 |
| KR | 20030021435 A | 3/2003 |
| KR | 20110081018 A | 7/2011 |
| KR | 20100013067 U | 3/2012 |
| TW | 201615248 A | 5/2016 |
| TW | 201615251 A | 5/2016 |
| TW | D185824 S | 10/2017 |
| TW | D208218 S | 11/2020 |
| TW | 202225903 A | 7/2022 |
| WO | 2014187024 A1 | 11/2014 |
| WO | 2018068613 A1 | 4/2018 |
| WO | 2021099796 A1 | 5/2021 |
| WO | 2023172191 A1 | 9/2023 |

* cited by examiner

MAGNETIC SLIDING CONTROLLER ACCESSORY FOR MOBILE PHONE GAMING

TECHNICAL FIELD

Some embodiments of the subject matter disclosed herein generally relate to methods and systems for gaming accessories, e.g., gaming controllers, that can be used with mobile phones and other devices.

BACKGROUND

The segment of the gaming industry developed and used for mobile phones continues to grow rapidly. It has been reported that the overall gaming market generated $184.4 billion in revenue in 2022, about half of which ($92.2 billion) is attributable to mobile gaming. Although not originally designed as gaming platforms, mobile phone systems have had their capabilities continuously upgraded over the years to a point where they are able to handle the graphics and processing requirements for most, if not all, sophisticated games created by software developers. However, one area that has been lacking in the mobile phone gaming segment is gaming accessories and, in particular, gaming controllers that can be used with mobile phones.

Conventional mobile phone controllers are usually either attached to the phone using a clamping mechanism that wraps around the user's phone or by implementing a special case that comes with the controller and must be installed onto the phone in a more permanent configuration. The special case allows for attachment points to be added to the mobile phone so that the controller can attach or slide on in different ways. Most of the existing mobile phone controllers are large and bulky and were not made with portability in mind. These mobile phone controllers are impractical to keep in a user's pocket or on their phone.

Another problem that existing controllers face is the battery life of the user's phone. Mobile gaming can be very draining on the user's mobile phone battery. If users are using their game controller out in public, i.e., away from ready charging capabilities, they don't want to be left stranded without a working phone or have to worry about that while in the midst of gaming.

Accordingly, it would be desirable to create game controllers for mobile phones that overcome these and other drawbacks and problems associated with conventional game controllers.

BRIEF DESCRIPTION OF THE DRAWINGS

The accompanying drawings, which are incorporated in and constitute a part of the specification, illustrate one or more embodiments and, together with the description, explain these embodiments. In the drawings.

SUMMARY

Figure 1:
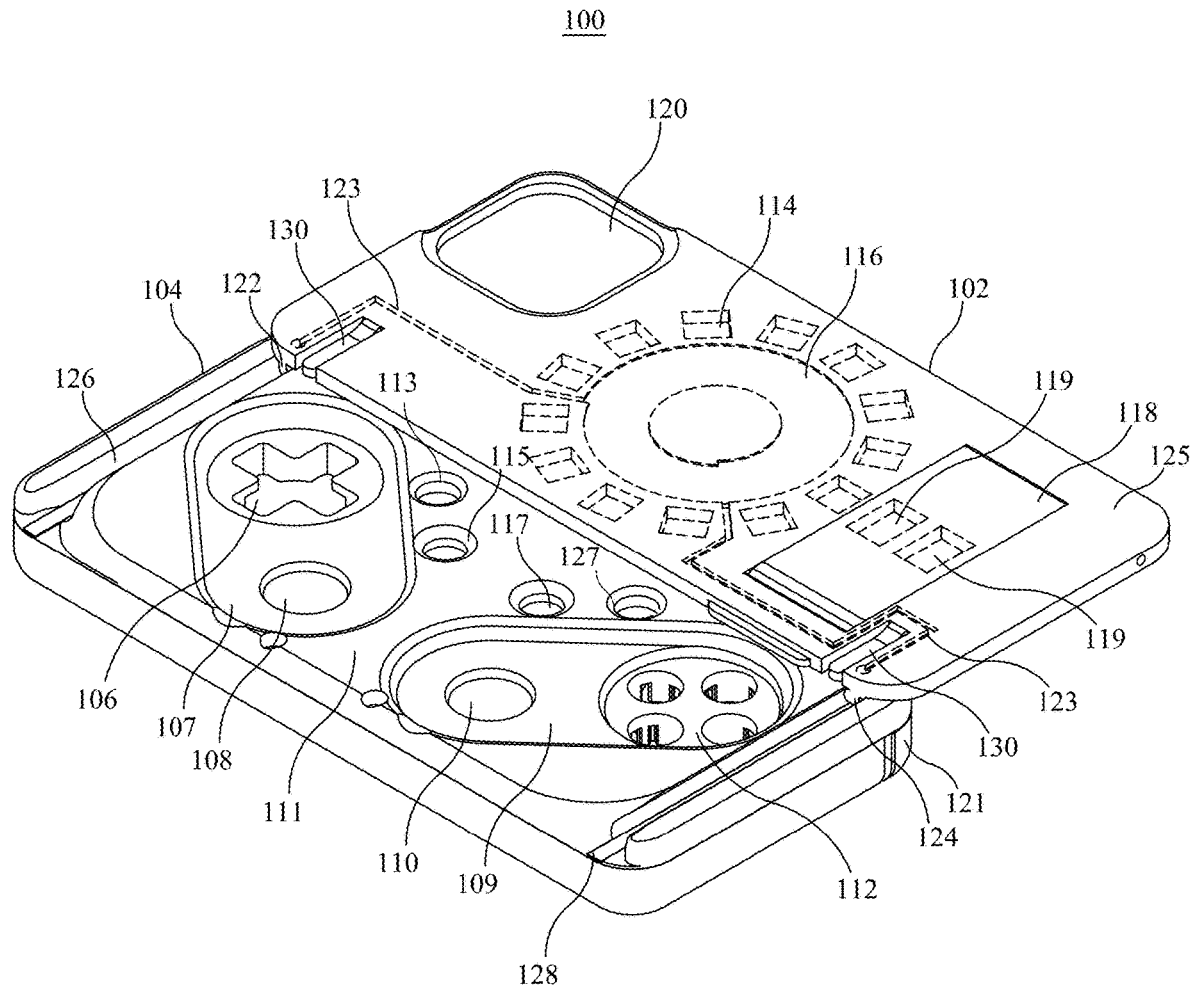
FIG. 1 is a top isometric view of a game controller in its open or attached active state according to an embodiment.

According to these embodiments, game controllers provide a portable controller accessory for mobile phone gaming with an upper case (housing) element and a lower case (housing) element. Hereafter the portable controller accessory is variously referred to as a "portable controller accessory", "portable controller", "gaming controller", or simply "controller". The portable controller accessory is usable in various states, e.g., an attached idle (closed) state wherein the upper case element is closed relative to the lower case element such that the edges of the upper case element are disposed directly on top of the edges of the lower case element. In this way, when in the attached idle state, the controller is very compact and can be easily carried in the user's pocket. The controller can also be placed into an attached active (open) state wherein the lower case element is partially slid out from the upper case element to expose the controller's control elements for gaming and place the control elements in a location suitable for a user's hands/fingers to operate the control elements during gaming. Additionally, the controller can be placed in a detached state where the upper and lower case elements are completely detached from one another. In the detached state, the lower case element with its gaming controls can be used with another gaming system or it can be used with the phone at a distance from the controller.

According to an embodiment, a game controller is configured to be removably connected to a mobile phone and includes an upper case element having a plurality of magnets embedded therein, which magnets are configured to enable a magnetic connection to the mobile phone; a lower case element having a plurality of gaming control elements disposed therein; and a sliding mechanism that enables the upper case element to slide away from the lower case element from a closed position wherein the gaming control elements are substantially covered to an open position wherein the gaming control elements are exposed.

According to another embodiment, a game controller is configured to be removably connected to a mobile phone and includes an upper case element having a plurality of magnets embedded therein, which magnets are configured to enable a magnetic connection to the mobile phone; wherein the upper case element further includes a charging coil configured to charge the mobile phone; a lower case element having a plurality of gaming control elements disposed therein and a battery; and a sliding mechanism that enables the upper case element to slide away from the lower case element from a covered position wherein the gaming control elements are substantially covered to an open position wherein the gaming control elements are exposed, wherein the battery is electrically connected to the charging coil disposed in the upper case element in both the covered position and the open position.

According to the previous embodiment, the sliding mechanism further comprises: two rails formed on the bottom surface of the upper case element configured to mate with two grooves formed in the lower case element to enable the upper case element to slide between the covered position and the open position.

According to the previous embodiment, the battery disposed in the lower case element is electrically connected to the charging coil disposed in the upper case element in both the covered position and the open position by providing an electrically conductive element on at least one of the two rails and at least one of the two grooves to complete an electrical circuit between the charging coil and the battery.

According to the previous embodiment, the gaming controller further comprises charging circuitry that converts electrical energy received from the battery into a resonant frequency signal that is passed through the charging coil to generate a magnetic field.

According to another embodiment, a game controller is configured to be removably connected to a mobile phone and includes an upper case element having a plurality of magnets embedded therein, which magnets are configured to enable a magnetic connection to the mobile phone; a lower case element having a plurality of gaming control elements disposed therein; and a sliding mechanism that enables the upper case element to slide away from the lower case element from a covered position wherein the gaming control elements are substantially covered to an open position wherein the gaming control elements are exposed, wherein the sliding mechanism further comprises at least two rails and at least two position retaining devices formed in the upper case element, and at least two grooves and at least two sets of retaining holes formed in the lower case element, wherein the at least two rails are disposed inwardly toward a center of the upper case element relative to the at least two position retaining devices.

According to the previous embodiment, each set of retaining holes includes a rear retaining hole associated with the covered position and a front retaining hole associated with the open position. The rear and front retaining holes can have different profiles or shapes. The at least two position retaining devices each include a protrusion having its own profile or shape. The profile or shape of the rear retaining holes and the profile or shape of the protrusions are selected such that a first predetermined force is needed to disengage the protrusions from the rear retaining holes. The profile or shape of the front retaining holes and the profile or shape of the protrusions are selected such that a second predetermined force is needed to disengage the protrusions from the front retaining holes. Typically, the second predetermined force is greater than the first predetermined force.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The embodiments to be discussed next are not limited to the configurations described below but may be extended to other arrangements, as discussed later.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification does not necessarily refer to the same embodiment. Further, the particular features, structures, or characteristics may be combined in any suitable manner in one or more embodiments.

According to these embodiments, game controllers provide a portable controller accessory for mobile phone gaming with an upper case (housing) element and a lower case (housing) element. Hereafter the portable controller accessory is variously referred to as a "portable controller accessory", "portable controller", "gaming controller" or simply "controller". The portable controller accessory is usable in various states, e.g., an attached idle (closed) state wherein the upper case element is closed relative to the lower case element such that the edges of the upper case element are disposed directly on top of the edges of the lower case element. In this way, when in the attached idle state, the controller is very compact and can be easily carried in the user's pocket. The controller can also be placed into an attached active (open) state wherein the lower case element is partially slid out from the upper case element to expose the controller's control elements for gaming and place the control elements in a location suitable for a user's hands/fingers to operate the control elements during gaming.

Additionally, the controller can be placed in a detached state where the upper and lower case elements are completely detached from one another. In the detached state, the lower case element with its gaming controls can be used with another gaming system, or it can be used with the phone at a distance from the controller.

In any of the three states described above, the user's phone can be attached to the upper case element of the controller via magnets. Additionally, the upper case element includes a kickstand which is operative to enable the user's phone to be supported on a flat surface at an angle relative to the lower case element and its included game control elements (in either landscape or portrait orientation). According to some embodiments, the gaming controller can also function as a battery bank for the mobile phone, and/or it can charge the phone while the user is using both the game controller and the phone to play games running on the phone. According to various embodiments, these and other features of gaming controllers will now be further described with respect to the Figures.

Figure 2:
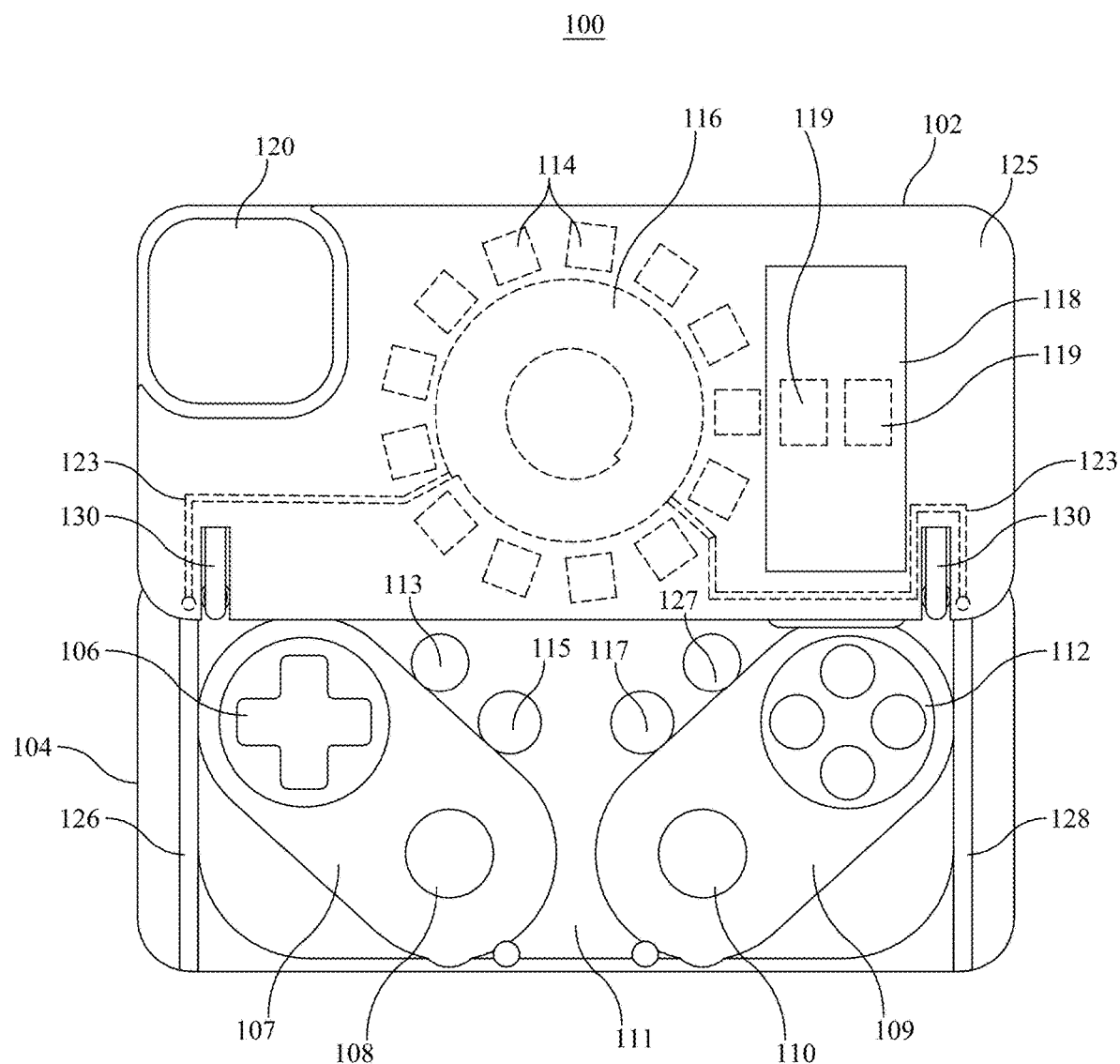
FIG. 2 is a top view of a game controller in its open or active state according to an embodiment.

FIGS. 1 and 2 depict a game controller 100 according to an embodiment in its attached active state wherein the upper case element 102 is slid out from the lower case element 104 to expose various gaming control elements 106, 108, 110, and 112. The upper case element 102 and lower case element 104 can have the same (or substantially the same) dimensions and shape of the mobile phone to which the game controller 100 is to be attached. The gaming control elements can include four face buttons 112, e.g., labeled X, A, B, and Y, which are frequently seen in gaming controllers, a D-pad 106, and two analog control sticks 108, 110, i.e., joysticks, all of which are configured to be used by the user's thumbs. The gaming control elements 106, 108, 110, and 112 are disposed in two oval recesses formed in the lower case element 104. These recesses enable the gaming control elements to be below the upper surface 111 of the lower case element 104 so that when the upper case element slides down to cover the lower case element, the bottom surface of the upper case element does not touch or impact the gaming control elements.

Note, however, that, according to other embodiments, the upper and lower case elements may have different dimensions. For example, to accommodate mobile phones of different sizes, the upper case element 102 may have its dimensions conform to the dimensions of the mobile phone, while the lower case element 104 may have one or more dimensions that are smaller than those of the upper case element 102.

In this embodiment, the game controller 100 also has four additional buttons, 113, 115, 117, and 127, two of which are disposed proximate to one of the oval recesses 107, and two of which are disposed of proximate to another of the oval recesses 109. These buttons can be programmed/configured to perform various operations such as "start", "select", "zoom-in", "zoom-out", etc. Additionally, four back buttons can be provided on the back side of the lower case element 104, which are intended to be used by the user's pointer fingers. These can include two trigger buttons which are disposed around the curved edges of the lower case element, and two other rectangular buttons, most of which are not visible in FIG. 1 (however, part of one of the curved trigger buttons 121 can be seen in FIG. 1, see FIG. 3 for more detail regarding these four back buttons).

Those skilled in the art will appreciate that the type, number, and placement of the gaming control elements disposed within or around the lower case element 104 can be varied from the gaming element configuration shown in the embodiment of FIG. 1.

Figure 13:
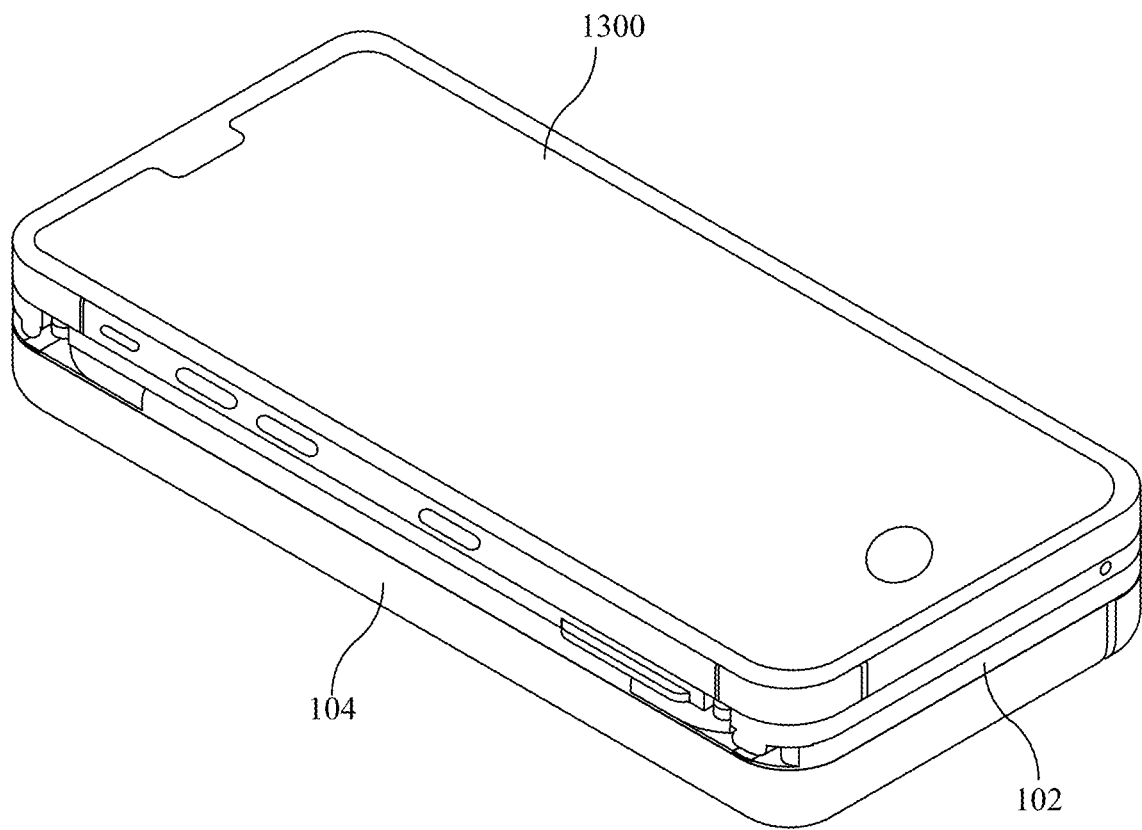
FIG. 13 shows a top isometric view of a game controller 100 in its attached idle state when it is magnetically connected to a mobile phone according to an embodiment.

The upper case element 102 also includes one or more magnets 114 which enable the controller 100 to be magnetically attached to the user's phone (not shown in FIG. 1, see FIG. 13). In this embodiment, thirteen magnets 114 are depicted, but more or fewer can be used. Magnets 114 are embedded or placed in the interior of the upper case element 102 in a configuration that conforms to the configuration of magnets within the user's phone (i.e., a MagSafe connection) so as to enable the upper case element 102 to achieve a magnetic snap connection when brought into proximity with the user's phone. The controller 100 can thus be magnetically connected to a user's mobile phone regardless of whether the phone has its own (additional) case or not. According to some embodiments, the upper case element 102 can also include a charging coil 116 that is connected to a battery disposed underneath the gaming elements in the lower case element 104 (not shown in FIG. 1) via electrical leads 123, one of which is positive and one of which is negative, which charging coil 116 enables the gaming controller 100 to also operate as a battery bank so as to keep the phone charged while the user is playing games. As will be appreciated by those skilled in the art, the charging coil 116 can comprise a wire that has a number of concentric loops or turns which, when current passes through, creates a magnetic field that induces a current into a receiver coil (not shown) in the phone. This charging capability of the controller 100 is further discussed below.

Figure 14A:
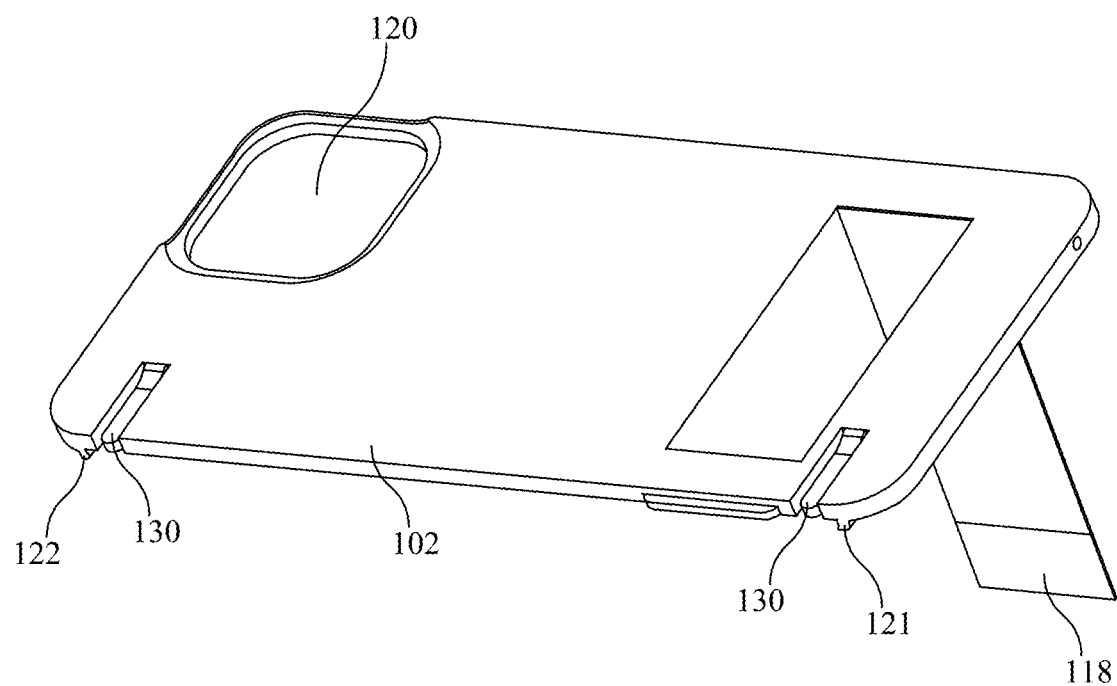
FIG. 14A illustrates the upper case element detached from the lower case element with the kickstand in its open position in a landscape orientation according to an embodiment.
Figure 14B:
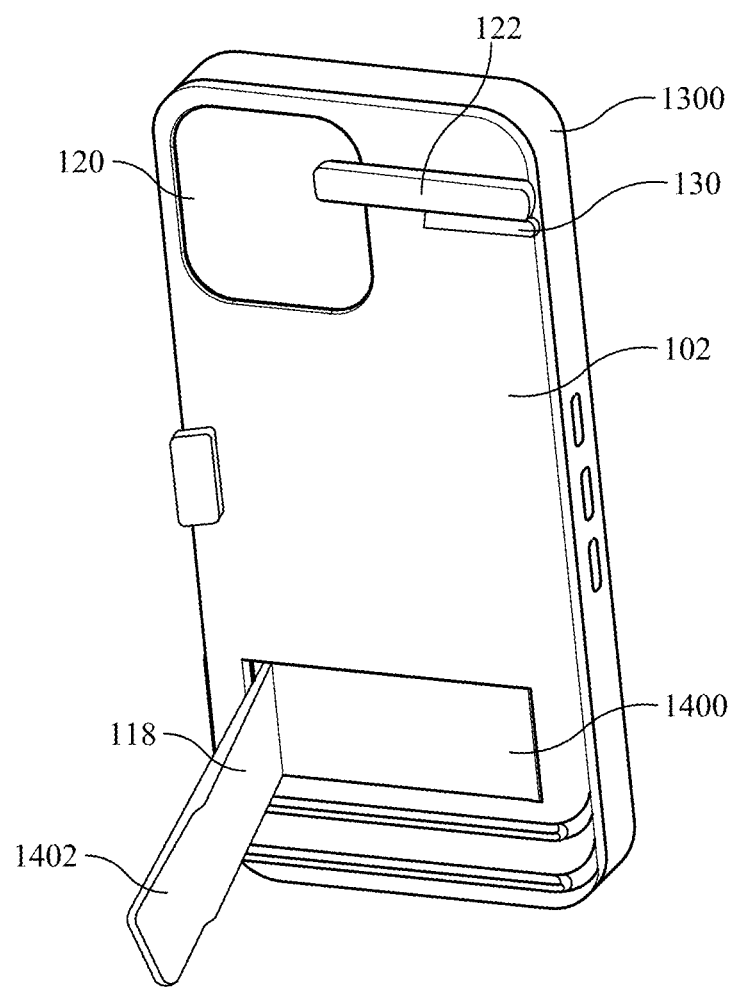
FIG. 14B illustrates the upper case element detached from the lower case element with the kickstand in its open position in a portrait orientation according to an embodiment.

The game controller 100 also includes a kickstand element 118. The kickstand element 118 is operative between a closed position (as seen in FIG. 1), wherein the kickstand element 118 is flush with an upper surface 125 of the upper case element 102, and an open position (see FIGS. 14A and 14B) wherein the kickstand element 118 extends at an angle relative to the upper surface of the upper case element 102. When moved into the open position, the kickstand element 118 supports the upper case element 102 (and the mobile phone when it is magnetically attached to the upper case element 102) at an angle relative to the lower case element 104 and the gaming elements within the lower case element 104. In this way, a user can easily view the screen of the mobile phone and use the gaming controls, either holding the combined mobile phone/controller combination in her or his hands, holding the detached lower case element 104 and gaming controller in her or his hands while placing the upper case element 102 connected to the mobile phone on a surface, or by placing the lower case element 104 on a surface near, but detached from, the upper case element 102. The kickstand 118 also includes one or more magnets 119, which magnets 119 magnetically bias the kickstand element 118 into its closed position so that, for example, the kickstand element 118 does not open up when not needed, e.g., when the unit is in the user's pocket.

The upper case element 102 also includes an opening or hole 120 formed therein. The opening or hole 120 is disposed and configured to enable, for example, camera elements (bumps) on the mobile phone to remain operative while the upper case element 102 is magnetically attached to the mobile phone. Additionally, the lidar sensor and flash remain operative, as well as any other sensor or device disposed on the mobile phone in the area that matches the opening 120 when the mobile phone is attached to the upper case element 102. The camera bumps on the mobile phone (not shown in FIGS. 1 and 2) extend through the opening 120 when the mobile phone is magnetically connected to the upper case element 102, such that the camera bumps are touching (or very close to) the edges of the opening 120 which aids in positioning of the controller 100 relative to the phone.

Moreover, by having the opening 120 in the illustrated position, the user can typically only place the upper case element 102 onto the phone in one way, i.e., with the top of the phone pointing left in relation to the user. However, in some situations when there is a case on the phone, the upper case element 102 can be oriented the other way around relative to the attached mobile phone, i.e., rotated 180 degrees in relation to the upper case element, with the top of the phone facing right in relation to the user. This latter orientation can be advantageous in certain games and applications.

As mentioned earlier, the upper case element 102 is slidably connected to the lower case element 104 via, in this embodiment, two rails 122, 124 formed in the upper case element 102 and mating grooves 126, 128 formed in the lower case element 104. Collectively, the rails 122, 124 and grooves 126, 128 form at least part of a sliding mechanism for the upper case element 102 and the lower case element 104 of controller 100 to slide between the attached idle state and the attached active state. The male rails 122, 124 fit smoothly into the female grooves 126, 128, respectively, and are configured to have a size and shape that enable the upper case element 102 to have only a single degree of freedom in relation to the lower case element 104, i.e., forward and backward on the x-axis which is parallel to the rails 122, 124, and the upper case element 102 cannot move in any other direction relative to the lower case element 104 when in its connected state FIGS. 1 and 2 also show spring release tabs 130, which can be lifted and/or pulled from retaining holes to enable the upper case element 102 to be completely detached from the lower case element 104, i.e., when the user lifts the release tabs 130, or pulls on the upper case element 102 with enough force, the upper case element 102's rails 122, 124 can slide completely out of their corresponding grooves 126, 128 in the lower case element 104. Thus it will be appreciated that the grooves 126, 128 continue all the way to the upper edge of the lower case element 104 and that each groove 126, 128 ends with a respective opening to enable the upper case element 102 to be slid completely out of the grooves 126, 128 to separate the upper case element 102 and the lower case element 104. These openings can be flared (made larger than the groove dimension) to enable the user to more easily align the rails 121 and 122 with their respective grooves 126 and 128 when the user re-attaches the upper case element 102 with the lower case element 104 by sliding the rails back into the grooves.

In order to enable the user to easily achieve the active, open configuration shown in FIGS. 1 and 2, i.e., wherein the upper case element 102 is slid almost completely out of the grooves 126, 128 but is not yet detached completely from the lower case element 104, the spring release tabs 130 can, in this embodiment, snap into respective, aligned holes (not shown in FIGS. 1 and 2, see FIG. 15) in the lower case element 102 when the tips of the spring release tabs 130 reach the aligned holes. This causes the tips of spring release tabs 130 (which may project slightly downwardly relative to an underside of the upper case element 102) to fall or spring into the aligned holes when they are reached by the tips during the sliding process. This causes the sliding process to be arrested and the gaming controller to be disposed in its attached active state wherein the gaming controls are exposed and games can be played on the user's phone.

The ease of operation from the attached idle state to the open active state is further enhanced by the tactile feedback experienced by the user when the spring release tabs 130 fall into the aligned holes to produce a distinct and robust indication of the commencement of a gaming session. Additionally, the spring release tabs 130 can be cut out on three sides, as shown in FIGS. 1 and 2, to create a spring tab that will make an audible click when their tips fall into the respective aligned holes. The holes can be beveled on both the side where the tips enter the aligned holes to click into the attached active state and also on the other side where the tips leave the aligned holes to permit complete detachment of the upper plate element 102 from the lower plate element 104, so as to create an arrestment of the sliding of the upper plate element 102 when it reaches the attached active state position but also enable detachment of the upper case element 102 from the lower case element 104 when pulled with a reasonable amount of force by the user (or alternatively/in conjunction with pressing downwardly on the ends of the spring release tabs 130 which remain connected to the upper case element 102 so as to effectively raise the tips of the spring release tabs 130 out of their respective aligned holes to enable the upper case element 102 to be completely slid out of the grooves 126, 128.

Figure 3:
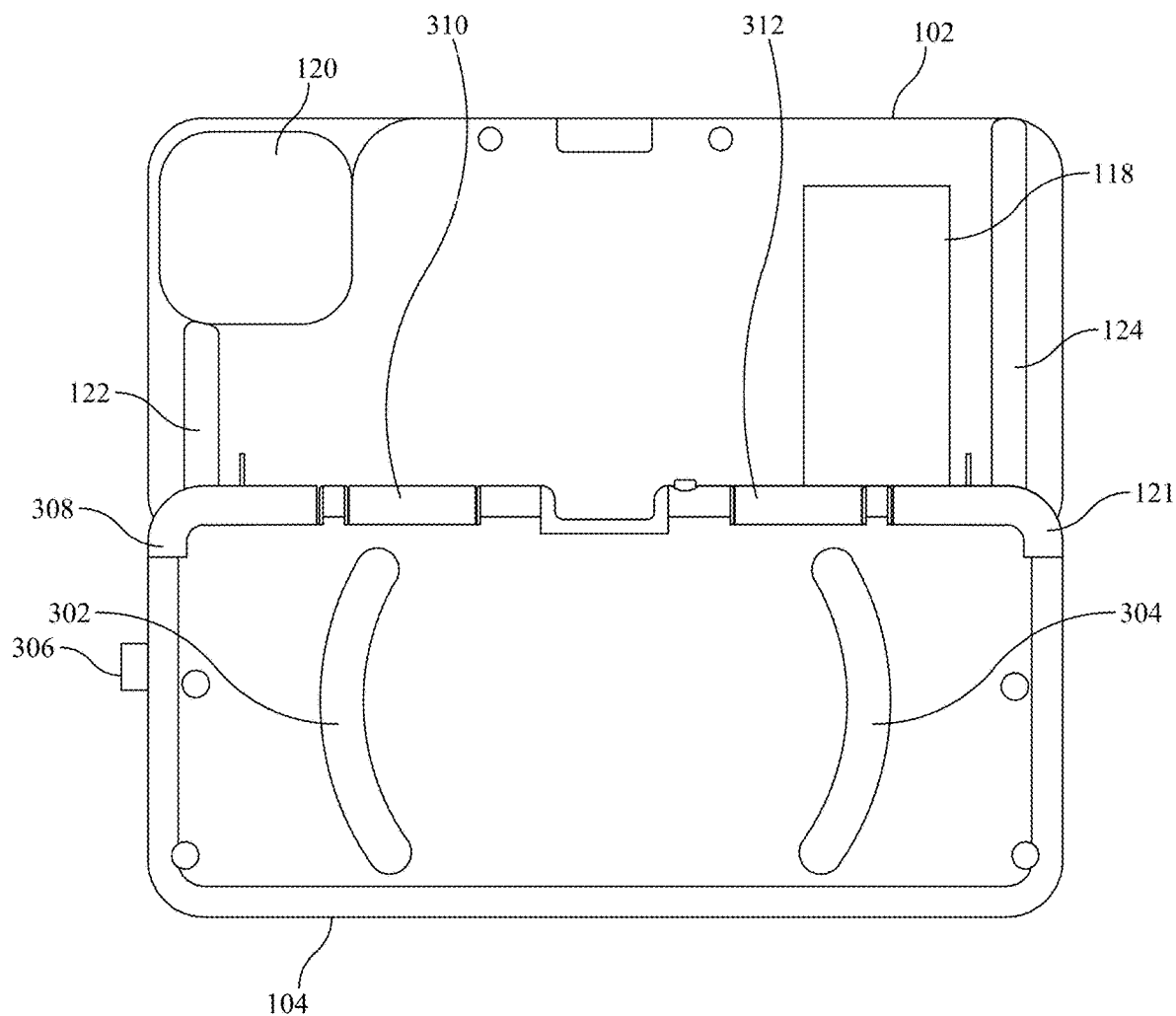
FIG. 3 is a bottom view of a game controller in its open or active state according to an embodiment

Referring now to FIG. 3, which is a bottom view of the controller 100 in its attached active state, it can be seen that the lefthand rail 122 extends along one side of the upper case element 102 until it reaches the opening 120, whereas the righthand rail 124 extends along the other side of the upper case element 102 across substantially the entire width thereof. Also seen in the bottom view of FIG. 3 are the left-hand grip 302 and right-hand grip 304, the right trigger button 121, a left trigger button 308, and the other two back buttons 310 and 312, which were mentioned above.

Figure 4:
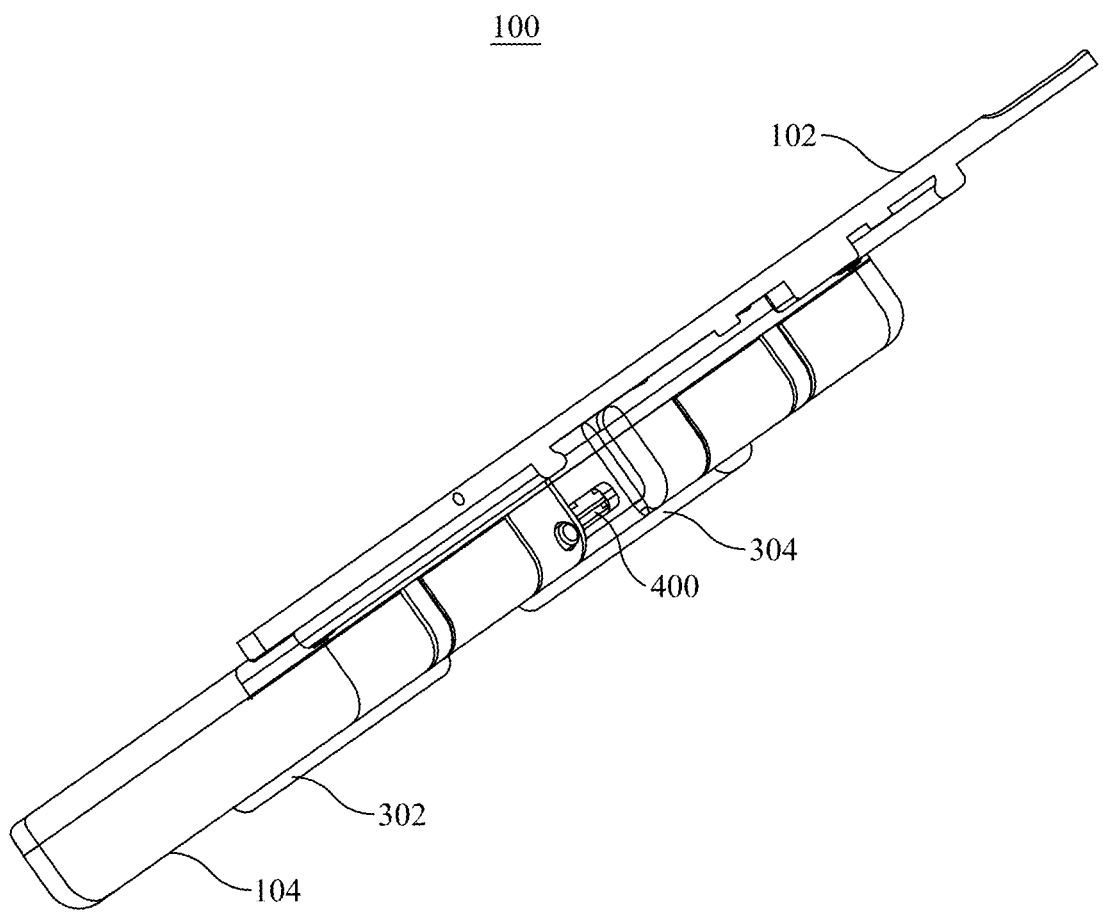
FIG. 4 is a right side isometric view of a game controller in its open or active state according to an embodiment.
Figure 5:
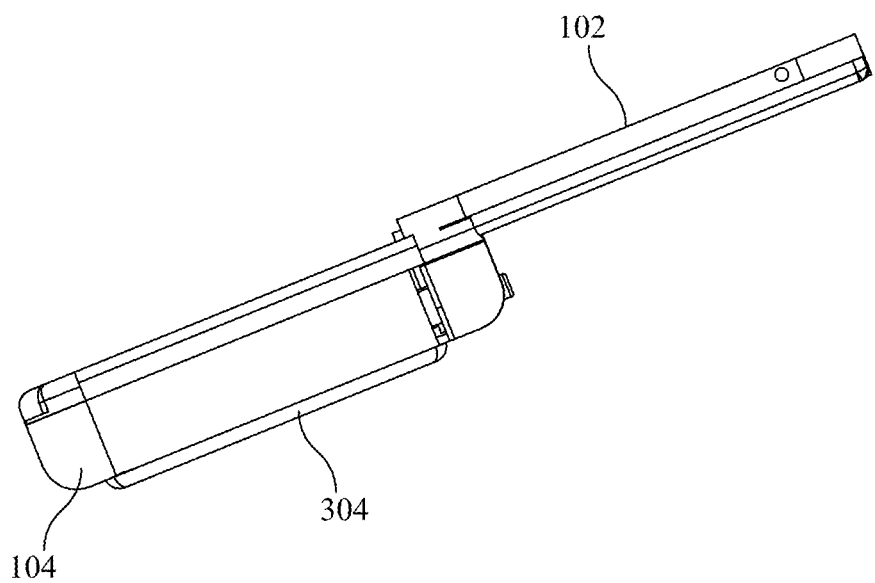
FIG. 5 is a right side view of a game controller in its open or active state according to an embodiment.
Figure 6:
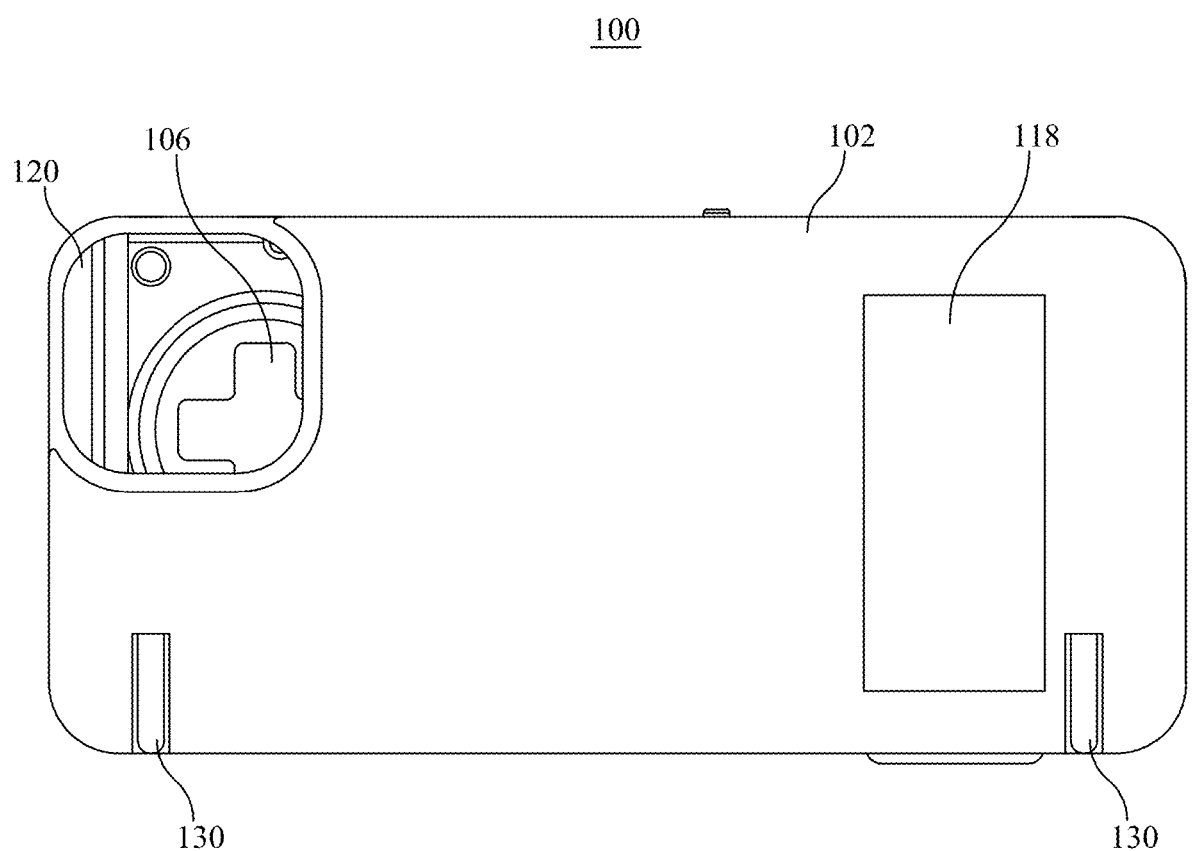
FIG. 6 is a top view of a game controller in its closed or attached idle state according to an embodiment.
Figure 7:
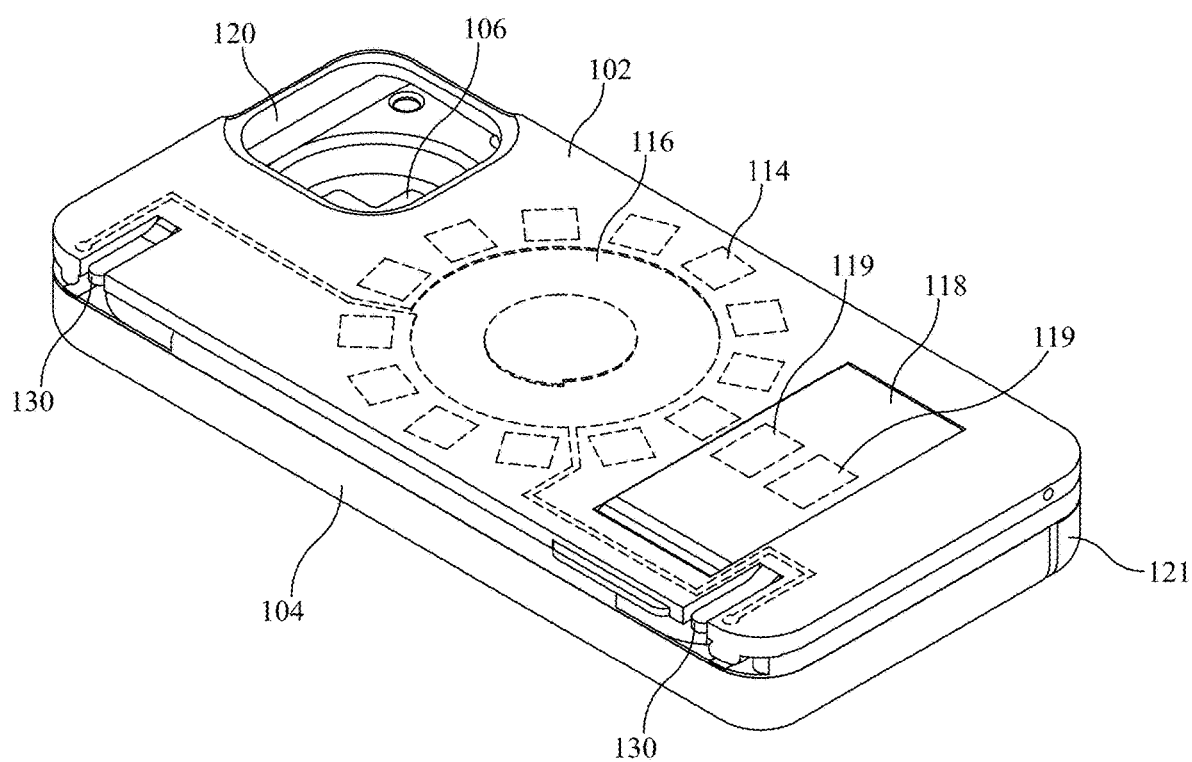
FIG. 7 is a top isometric view of a game controller in its closed or attached idle state according to an embodiment.
Figure 8:
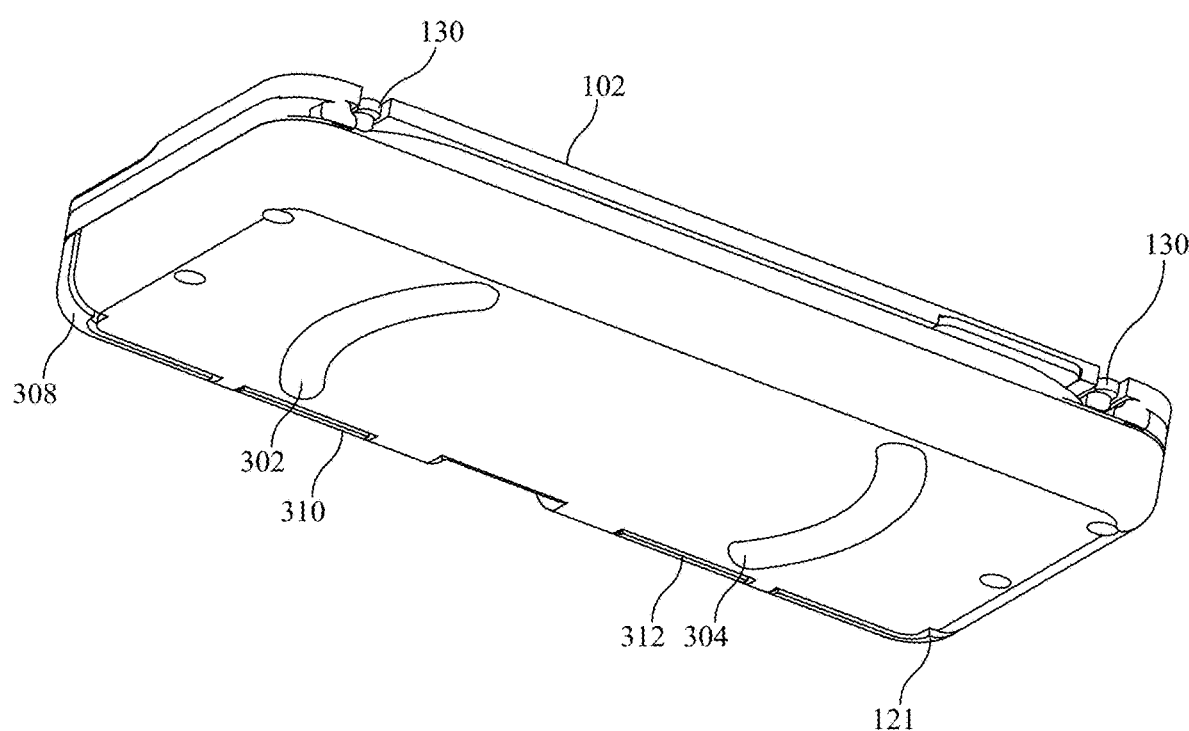
FIG. 8 is a bottom isometric view of a game controller in its closed or attached idle state according to an embodiment.
Figure 9:
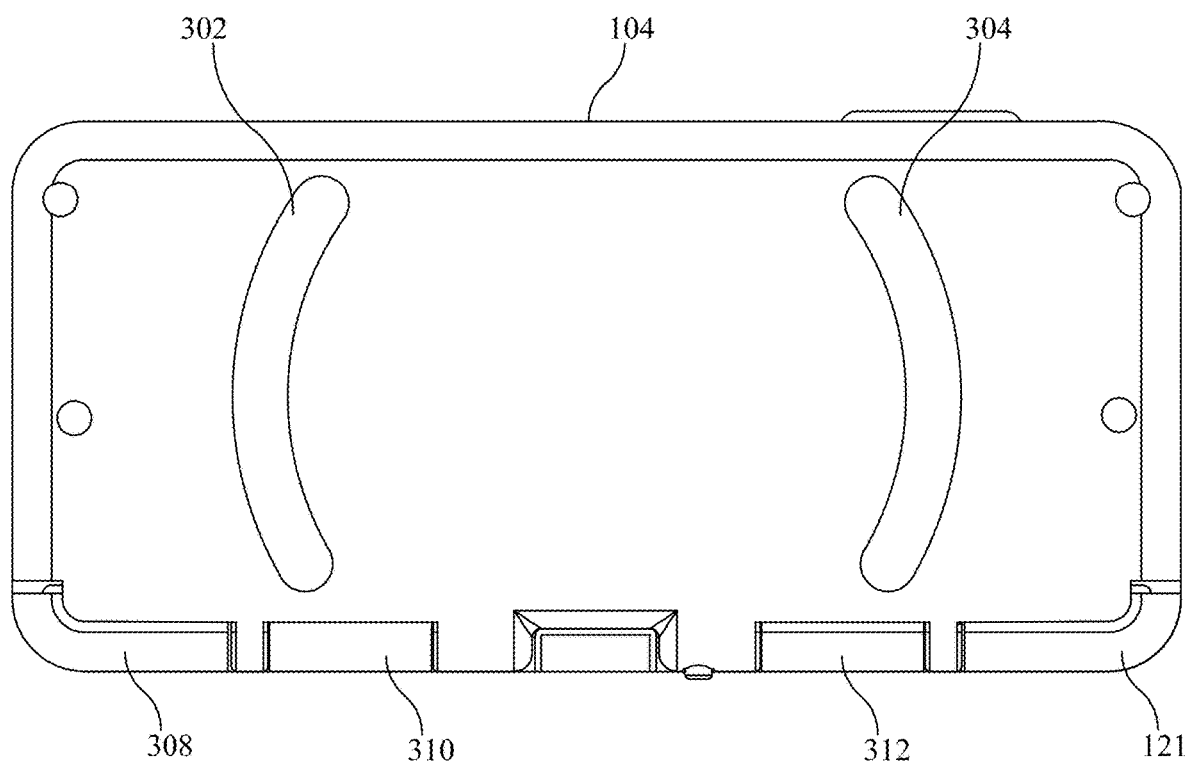
FIG. 9 is a bottom view of a game controller in its closed or attached idle state according to an embodiment.
Figure 10:
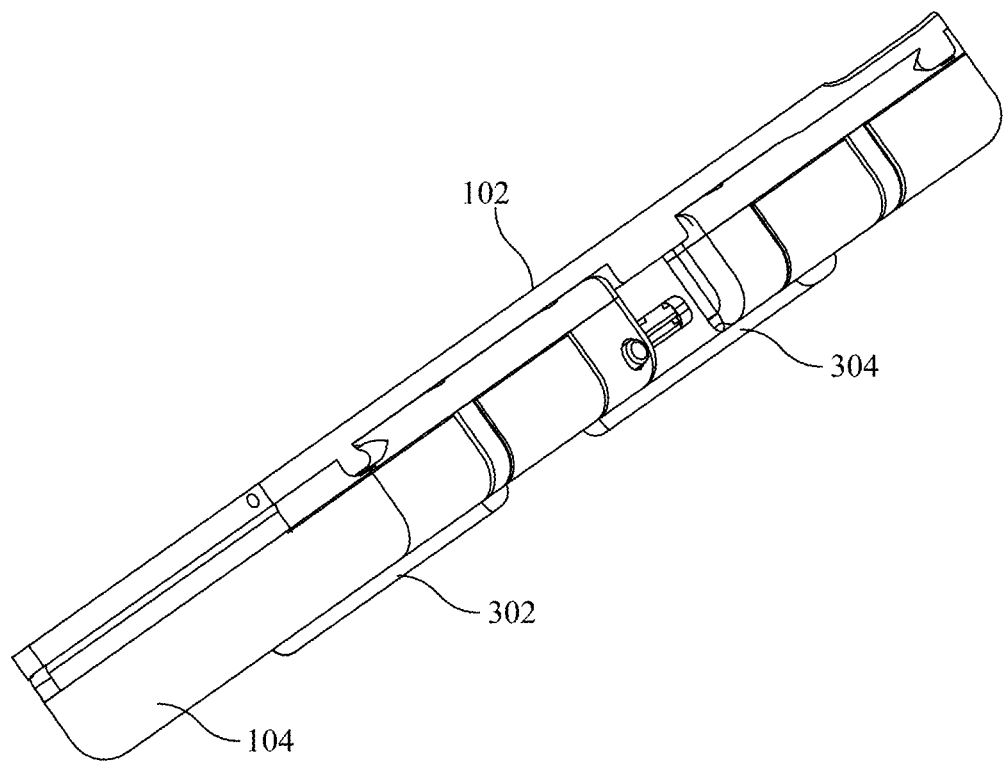
FIG. 10 depicts a right-side isometric view of a game controller in its attached idle state according to an embodiment.
Figure 11:
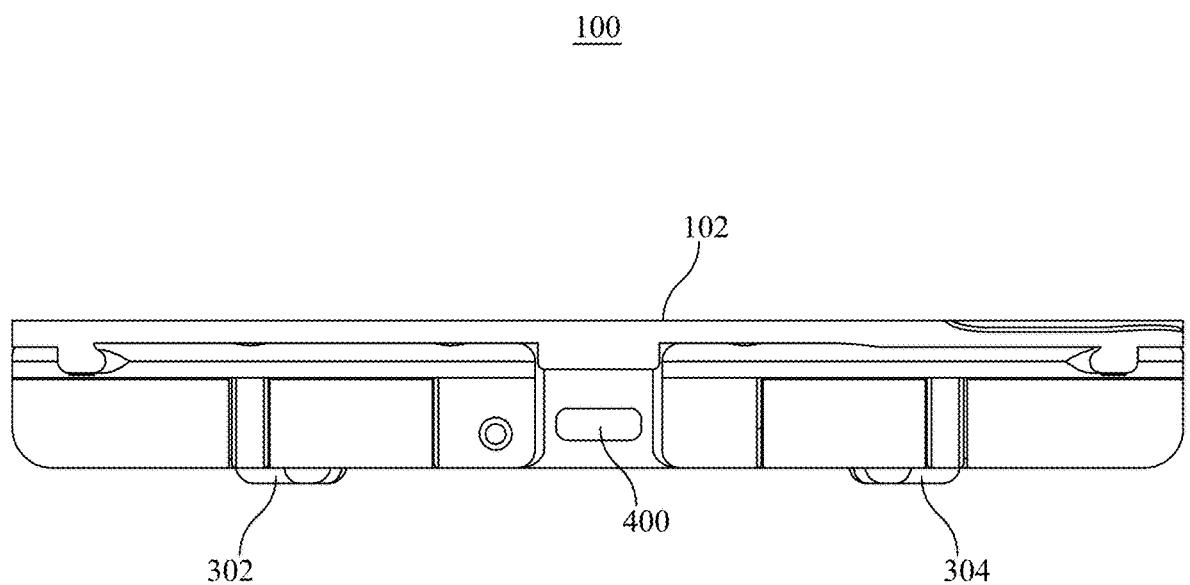
FIG. 11 shows a right-side view of a game controller in its attached idle state according to an embodiment.
Figure 12:
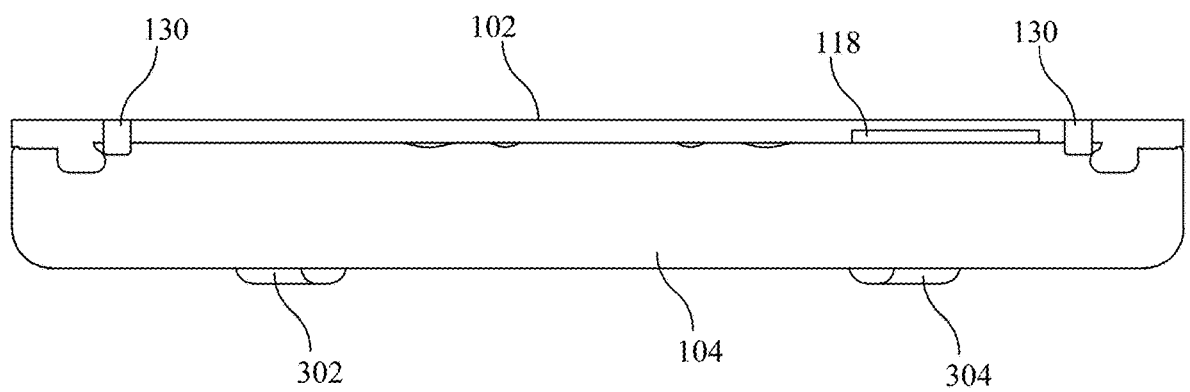
FIG. 12 depicts a left-side view of a game controller in its attached idle state according to an embodiment.
Figure 15:
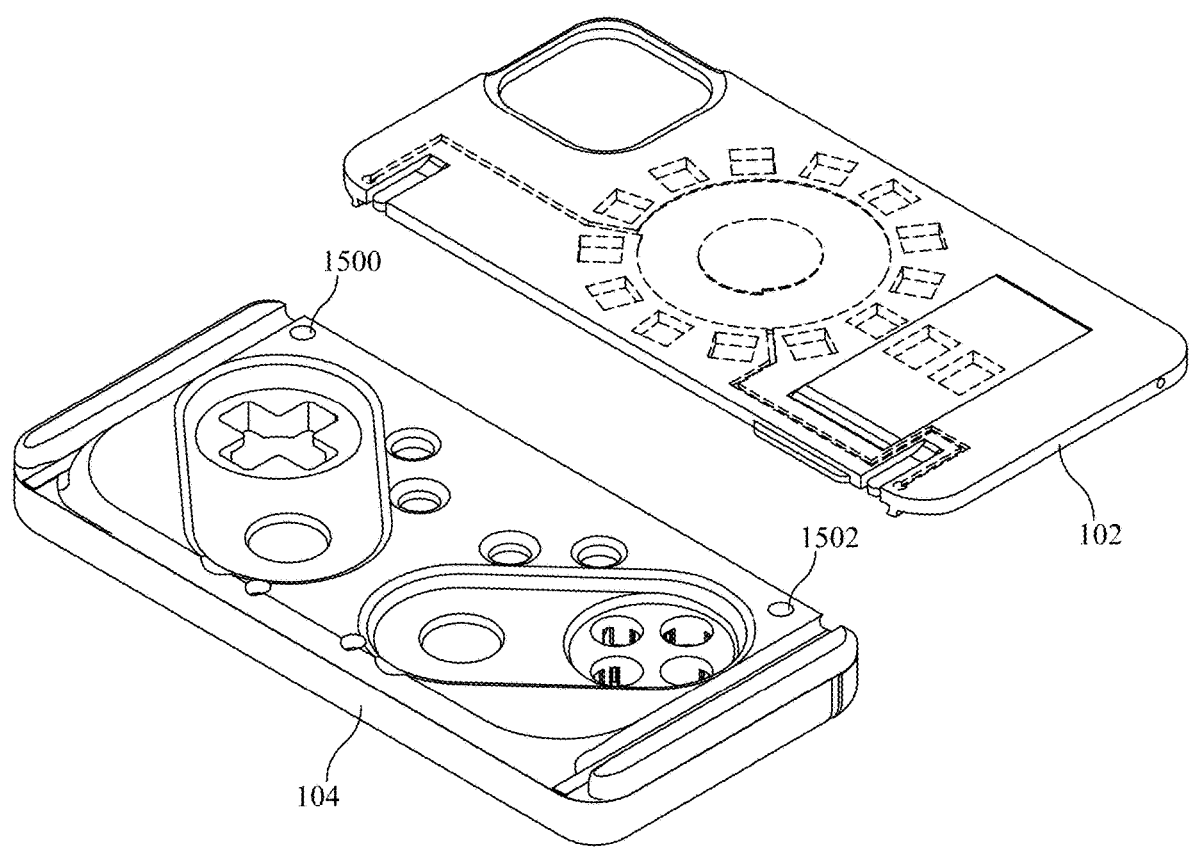
FIG. 15 shows an exploded view of a game controller according to an embodiment.

FIG. 4 illustrates a right-side isometric view of controller 100, and FIG. 5 illustrates a right-side view of controller 100. A USB-C port 400 can be provided in the lower case element 102 on any side thereof. FIG. 6 illustrates a top view of controller 100 in its attached idle state, i.e., wherein the upper case element 102 completely covers the lower case element 104, with the exception that opening 120 exposes a part of one of the gaming control elements 106. FIG. 7 shows a top isometric view of controller 100 in its attached idle state. FIG. 8 shows a bottom isometric view of controller 100 in its attached idle state. FIG. 9 shows a bottom view of the controller 100 in its attached idle state. FIG. 10 depicts a right-side isometric view of controller 100 in its attached idle state. FIG. 11 shows a right-side view of controller 100 in its attached idle state. FIG. 12 depicts a left-side view of controller 100 in its attached idle state. FIG. 13 shows a top isometric view of controller 100 in its attached idle state when it is magnetically connected to a mobile phone 1300. FIG. 14 illustrates the upper case element 102 detached from the lower case element 104 with the kickstand 118 in its open position. FIG. 15 shows an exploded view of the game controller 100 in its detached state. In FIG. 15, the aligned holes 1500 and 1502, into which the tips of the spring release tabs 130 enter and exit so as to click into and out of the attached active configuration, can now be seen with the upper case element 102 completely removed from the lower case element 104.

From the foregoing description of FIGS. 1-15, various use cases for game controllers according to these embodiments can be foreseen. The default configuration of game controller 100 can be its attached idle state. This attached idle state coincides with the upper and lower portions of the sliding mechanism being attached to one another and fully slid down, as seen in FIGS. 6-13. In this state, the sliding upper plate 102 is firmly, but removably, held in place by the tips (bumps) that recess into the controller's aligned holes 1500, 1502. These bumps act as a compliant mechanism that can firmly hold the upper case element 102 in place so as to not enable the upper case element 102 or lower case element 104 to rattle around or come undone from one another unintentionally. However, the user can still easily slide the upper case element 102 out of this open position in either direction, i.e., to detach the upper case element 102 or to close the upper case element 102 over the lower case element 104. See also FIG. 16 which shows one of the two compliant mechanisms in an exploded view.

In this embodiment, the sliding upper plate 102 also has a bump stop (not shown) that hinders it from sliding off the controller in the wrong direction and stops it at the right spot for this closed configuration. In this closed configuration (also referred to as the "idle connected state" herein), the controller's gaming control elements are protected. According to this embodiment, the controller/mobile phone combination is also extremely compact and portable in this state and can be very comfortably slid into the user's pocket and/or safely thrown into the user's bag for transport.

In this closed configuration the controller 100 can also be attached to the user's phone through the MagSafe magnets 114 and left there for the phone to be used as normal with its touchscreen. The controller 100, when attached to the phone like this, only adds a few centimeters (e.g., 1-4 cms) to the phone's overall thickness. The user can then switch the controller 100 to its second, open configuration (also referred to herein as its "active attached state") by sliding the upper plate 102 upwardly relative to the lower plate 104, which operation can be performed with or without the phone attached to the controller 100, as described in the following paragraph.

Figure 16:
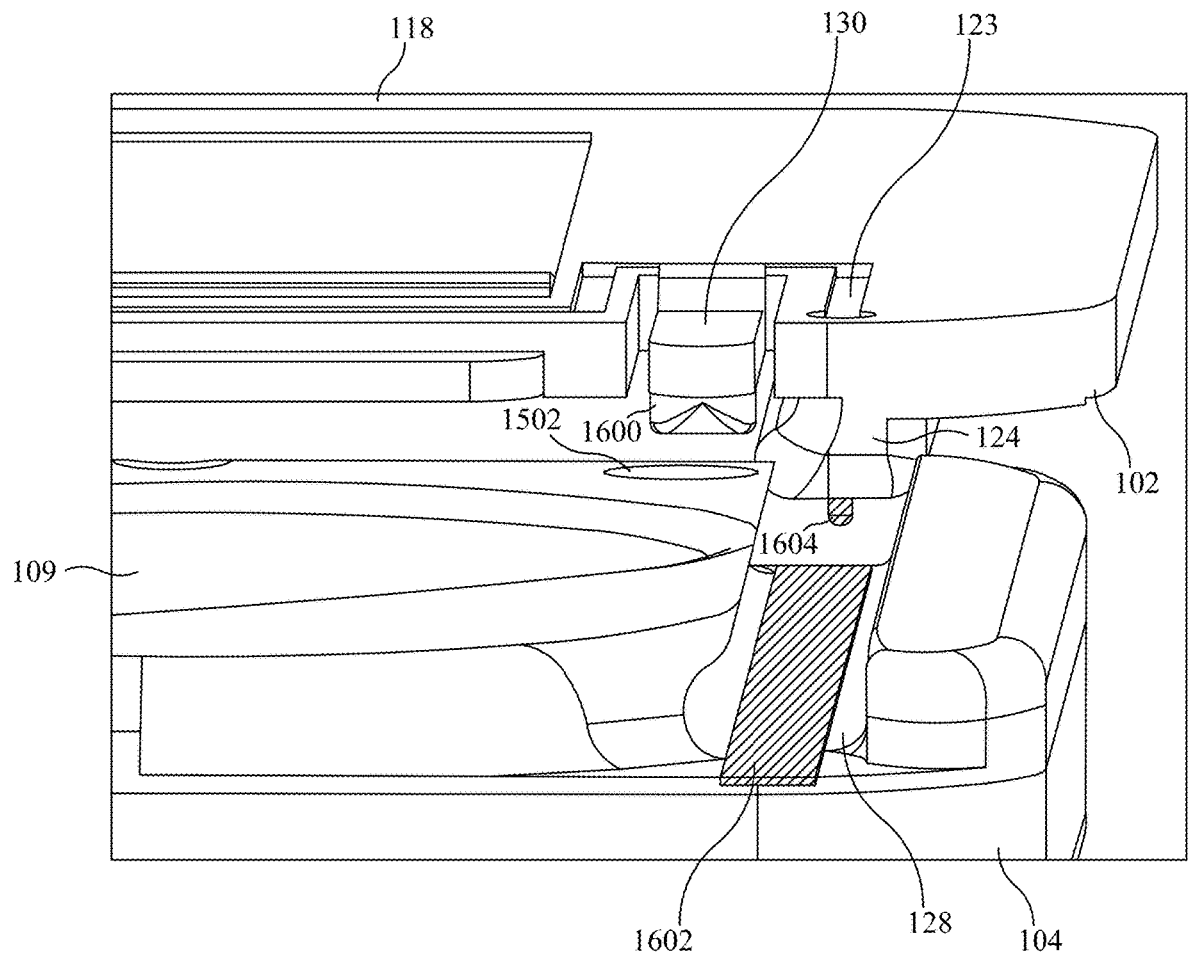
FIG. 16 is a partially exploded view of a game controller, including electrical contacts for a charging coil in the upper case element and for charging circuitry in the lower case element, that enable the game controller to charge a phone at various sliding positions according to an embodiment.

The controller 100's second (active) configuration is its default active playing state, i.e., the attached active configuration, as seen in FIGS. 1-5. This configuration can include a position wherein the sliding mechanism (upper plate 102) is attached to the controller (lower plate 104) and slid almost all the way out of the grooves 126, 128 and held there at this position with a compliant mechanism, one part of which is seen in FIG. 16. The view in FIG. 16 is a partially exploded view which better enables the reader to see some of the relevant components of the controller 100, in particular one of the (two) compliant mechanisms 130 (also referred to above as a "spring release tab") and also elements of the charging mechanism which will be described in more detail below. Regarding the compliant mechanism 130, it can be seen that, when assembled, rail 121 can slidably travel along groove 128 as pulled under force by the user's hand (or alternatively via a small motor or spring-loaded device). The compliant mechanism 130 travels along the upper surfaces of the lower case element 104, which are directly beneath it, as the rail 121 traverses the groove 128. When the tip 1600, which protrudes downwardly and can also be biased downwardly based on the design of the cutout spring tab 130, reaches the aligned hole 1502, it will fall into the hole 1502 and removably arrest the upper case element 102 in that position. As described previously, hole 1502 and/or tip 1600 of the compliant mechanism 130 can be beveled to a degree that dictates the amount of force needed to release the upper case element 102 from hole 1502 and move the rail 121 in either direction relative to groove 128.

This compliant mechanism is placed next to the two rails on the sliding plate 102, as seen in FIG. 1. In this embodiment, each compliant mechanism is placed outside of their respective rails (but see the embodiment of FIGS. 18-20 described below). The compliant mechanism has an extrusion or tip for each rail that protrudes downwardly in relation to the sliding plate 102. These extrusions, when in this second (active) configuration, recess into holes 1500, 1502 designed into the controller as seen in FIG. 16. This hole 1500, 1502 fits the compliant mechanism's extrusion with high tolerance. This complaint mechanism keeps the controller 100 in this slid-out (active) configuration. It is easy for the user to know when sliding out the upper plate 102 that the upper plate 102 is in the right spot to expose and enable the use of the gaming controls as the upper plate 102 snaps into place mechanically and audibly. The upper plate 102 is firmly held in this position by the compliant mechanism and should not rattle or wiggle even with the weight of the user's phone being attached thereto. The user can also easily slide the upper plate back in (to its closed configuration) or out (to its detached configuration) as the compliant mechanism will give way as intended. In this active configuration, the upper plate 102 can be attached to the phone (or was already attached to the phone before being slid out), and can be comfortably used to play games on the user's phone through its Bluetooth connection which can be used to send electronic signals from the controller to the phone, i.e., signals which provide inputs to a game running on the phone based on actuation of the gaming controls.

This active configuration is very comfortable for play, and it reveals all of the buttons and other controls needed to play all of the most advanced or simple games on the mobile phone (or other device). The user can also easily reach their phone's touchscreen to do things like type, change a setting of the phone, e.g., brightness, or check on notifications. Using the touchscreen on the controller 100 is much more ergonomic than trying to use the touchscreen with other controllers. While in this active state, the phone is not hindered in any way, i.e., the user can still use the phone's cameras or flashlight, access the volume buttons or off button as well as access the phone's charging and data port. In this active state, the upper plate 102 can be very quickly slid away to stay on the back of the phone or detached from the phone to be put away or set aside. In particular, the embodiments described herein enable a user to use his or her mobile phone while held vertically (i.e., lengthwise) as one would typically do to make phone calls, whereas at least some other mobile gaming controllers make that awkward. Additionally, unlike other controllers, these embodiments do not block any parts of the camera(s) or the phone port (which is used to charge the phone).

While in this active configuration, one possibility would be to use the phone in portrait mode, i.e., the phone (connected to the upper case element 102) can be rotated 90 degrees in relation to the lower case element 104 with the top of the phone pointing up. This would be an advantageous gaming style for certain games that many other controllers do not offer. According to various embodiments it is possible to have all of the controls of the controller accessible in this configuration without hindering it in any way. The ability to rotate the upper case element 102 while it is magnetically attached to the phone is an intended design feature default in the MagSafe magnet array, as it is a circle.

The controller 100's third configuration is its detached active state. This state occurs when the sliding mechanism/upper case element 102 is fully detached from the controller/lower case element 104, by pulling the upper case element with sufficient force that the compliant mechanisms exit their respective retaining holes. When the gaming controller 100 is in the detached active state, the upper case element 102 is either not attached to the phone (as seen in FIG. 15) or is attached to the phone. In this detached state, the controller/lower case element 102 acts as a normal, standalone handheld controller (which can be used to game on the phone or on another gaming platform), and the sliding mechanism/upper case element 102 stays attached to the phone and can be used as a kickstand on a tabletop or flat surface as the sliding plate has a built-in integrated kickstand 118.

According to some embodiments, when in its first and second configurations, the kickstand 118 cannot pop out intentionally or unintentionally and does not hinder the use of the controller 100 in any way. According to some embodiments, the kickstand 118 cannot pop out in these two configurations as the controller gets in the way and blocks it from being able to rotate down on its hinge. The kickstand 118 also cannot rotate up as the phone is in its way as well as the sliding plate's bridge 1400 (see FIG. 14B) that is disposed overtop of the hinge. This bridge 1400 is placed in this position to enhance the structural integrity of the sliding plate 102. The bridge also carries the wires of the wireless charging coil described later in this passage. When detached from the controller 100 and attached to the user's phone, the kickstand 118 is held in place relative to the phone and hindered from rotating on its hinge or moving. The kickstand 118 also has magnets 119 embedded in it which are designed to hinder attachments from rotating on the phone. The magnets 119 in the kickstand 118 not only hinder the rotation of the sliding plate 102 in relation to the phone but also hinder the kickstand 118 from rotating in relation to the sliding plate 102 on its hinge. The user can release the kickstand's magnetic connection to the phone's magnets by simply rotating it down, thereby allowing the user to use the kickstand 118 as intended. The kickstand 118 is also designed to slightly stick out from the outer edge of the sliding plate 102 to give the user something to easily grab onto with a finger to deploy the kickstand more ergonomically.

This detached active configuration allows for a more comfortable playing position for the user when convenient for them, e.g., at a coffee shop or at the dinner table. In this configuration, the sliding mechanism and its kickstand can be placed in a portrait or landscape position, depending on the game being played. In this configuration, the sliding mechanism can also be detached from the phone and placed aside so the user can use the built-in MagSafe connector default on the user's phone in order to be placed on a MagSafe puck that the user may have, e.g., in their car or on the wall next to the bed or nightstand for an even more comfortable playing stance. Another feature of these embodiments is their ability to wirelessly charge the user's phone when in configuration either of the attached configurations, i.e., idle or active.

The controller 100 can also act as a normal battery bank and charge anything through its Usb-C port 400 when in any configuration. This feature was implemented for the convenience of the user. While gaming, the user's phone is under a large load, and its battery will drain faster than usual. This can create a lot of stress for the user who doesn't want to be stranded without a phone. In principle, according to these embodiments, game controllers with their wireless charging capabilities are their own stand-alone devices separate from the user's phone, with their own battery and battery life. When connected to the phone, the controller can charge the phone up to its full battery level, or the controller can keep the phone at a consistent battery percentage, thereby effectively separating itself from the phone in terms of there being no phone battery drain. In this way, the user's phone will have the same battery status before and after gaming when using controllers according to these embodiments essentially turning the game controller into its own separate gaming console from an electrical power status.

Thus, various electrical components are discussed or implied above and reside on one or more printed circuit boards (PCBs) housed within the lower case element 104 below the gaming control elements. A high-level circuit diagram of some of those elements is provided in FIG. 17. However, those skilled in the art will appreciate that more, other, or fewer elements could be provided in different embodiments. Therein, a battery 1700 provides power to the various electrical components, e.g., via a power bus 1702 or other electrical conduits. These various electrical components include, e.g., a USB port device 1704, a Bluetooth transmitter 1706 (or transceiver), a microcontroller 1708, various I/O devices 1710 (some of which are described above, e.g., gaming controller elements), and charging circuitry 1712 which is used to supply charging power to the charging coil 116 in the upper case element 102. The USB port 1704 can be used for various purposes, such as charging the battery 1700 or providing a wired connection to other gaming systems. As described above, the Bluetooth transmitter (or transceiver) 1706 can be paired with the phone 1300 attached to the gaming controller 100, e.g., by pressing a pairing button on the gaming controller 100 to enable the gaming controller 100 to provide inputs (and potentially to enable the phone to provide outputs, e.g., haptic outputs to the gaming controller 100) based on the user's manipulation of the various gaming control elements described above to the game running on the phone 1300 (or other gaming console). Microcontroller 1708 controls the operation of all of the various other components disposed on the PCB. The I/O devices 1710 include all of the buttons, joysticks, the D-Pad, and any other relevant input/output devices associated with the gaming controller 100. Charging circuitry 1712 can be used to charge the phone 1300's battery, as described briefly above and in more detail below, via the charging coil 116 disposed in the upper case element. The arrow shown between charging circuitry 1712 and charging coil 116 represents the various conductive elements provided in the controller 100 to electrically connect these two elements. All of these components (or a subset thereof) can be linked via, for example, a data bus 1714 (or other communication mechanisms).

According to some embodiments, the wireless charging printed circuit board 1712 is contained within the controller shell, i.e., the lower case element 104. The charging board 1712 has two pads (not shown) for the negative and positive wires of the charging coil 116. Looking now at FIG. 16 again, in order to maintain an electrical connection between the charging circuitry 1712 disposed in the lower case element 104 and the charging coil 116 disposed in the upper case element 102, a positive wire is routed from the positive pad on the charging board 1712 to a conductive, e.g., brass, plate 1602 that is integrated into the controller's right sliding slot 128 at the bottom. A negative wire is routed to the left sliding slot 126 to a conductive plate in the same way. The wireless charging coil 116 is integrated into the sliding mechanism (upper case element 102) concentrically relative to the MagSafe magnet array 119, as seen in, for example, FIG. 1. Note that, as described below, the charging circuitry 1712 can alternatively be provided on a PCB beneath the charging coil 116 in the upper case element 102 according to other embodiments.

For example, the charging coil 116 can be implemented as one long wire 123 wrapped around itself in a circular concentric pattern. One end of the wire 123 exits from the outer diameter of the coil 116. The other end of the wire 123 exits from the inner diameter of the coil 116. The inner wire is routed to the right rail of the sliding mechanism, as seen in FIG. 1, and is soldered to a pogo pin 1604 (a conductive spring-loaded pin) that exits out the bottom end of the sliding mechanism's rail 121, as seen in FIG. 16. The same is true for routing the outer wire to the left rail 122 and pogo pin (not shown). When the controller 100 is in either the attached idle state or the attached active state, these pogo pins 1604 connect the charging coil 116 to its PCB 1712 via the conductive plates 1602 found in each groove, thereby completing the circuit and allowing the circuit to charge the phone. This charging capability does not hinder the controller 100 in any way in any of its configurations. The controller 100 works the same mechanically as if the charging components were not present, and the user should not notice anything other than that the phone is charging. None of this charging functionality would typically be visible to the user as it is all embedded inside the housing. In this embodiment, the pogo pins, e.g., pin 1604, and the brass strips, e.g., strip 1602, are the only things visible to a user.

Figure 17:
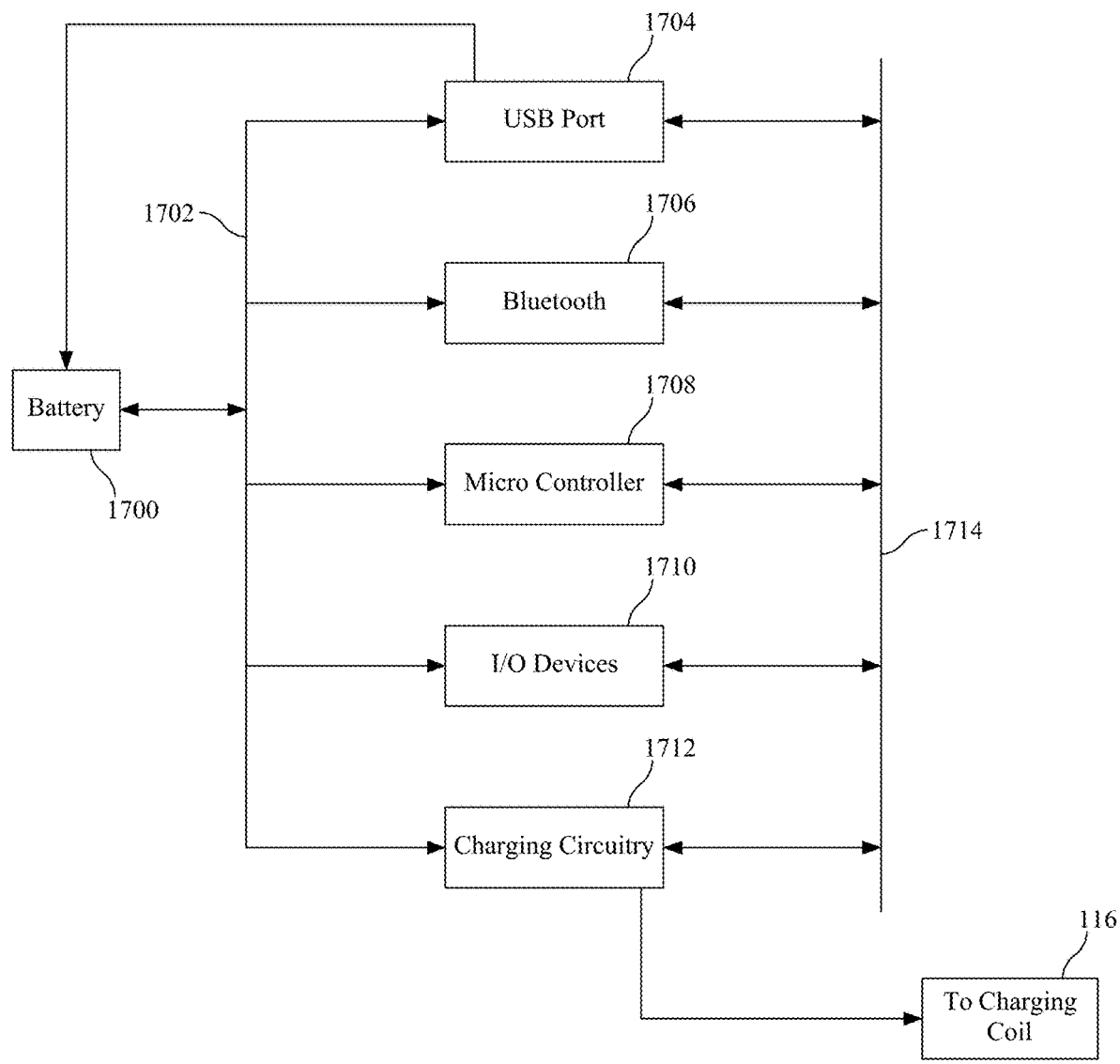
FIG. 17 is a block diagram of various electrical components associated with game controllers according to embodiments.

It will be appreciated that the embodiments of FIGS. 1, 16, and 17 illustrate and describe portions of the electrical circuitry that enables the gaming controller to act as a wireless charger/battery bank for the mobile phone, including charging coil 116, negative and positive traces 123 connected to the charging coil 116, which traces 123 are connected to pogo pins 1604, which in turn contact conductive plates or strips 1606. The plates or strips 1606 are electrically connected to output terminals (not shown) of the charging circuitry 1712. Alternatively, if the charging circuitry 1712 is disposed in the upper case element 102, e.g., beneath the charging coil 116, then the plates or strips 1606 are electrically connected to power terminals (not shown) associated with battery 1700. Examples of charging circuitry and coil available in one package include CVSMicro models CV222X/3X, CV222, and CV223 and ConvenientPower modules CPS812X, CPS822X, and CPS823X.

The sliding mechanism described above with respect to FIGS. 1-16 illustrates one or more embodiments of a mechanism for sliding an upper case element that is connected to a mobile phone relative to a lower case element into a position to either cover the gaming control elements or to expose the game elements for play (or alternatively to disengage the two elements entirely). However, those skilled in the art will appreciate that other sliding mechanisms can be implemented in gaming controllers according to other embodiments to enable benefits that are the same as (or similar to) those offered by the previous embodiments. An example of an alternative sliding mechanism will now be described with respect to FIGS. 18 and 19.

Figure 18:
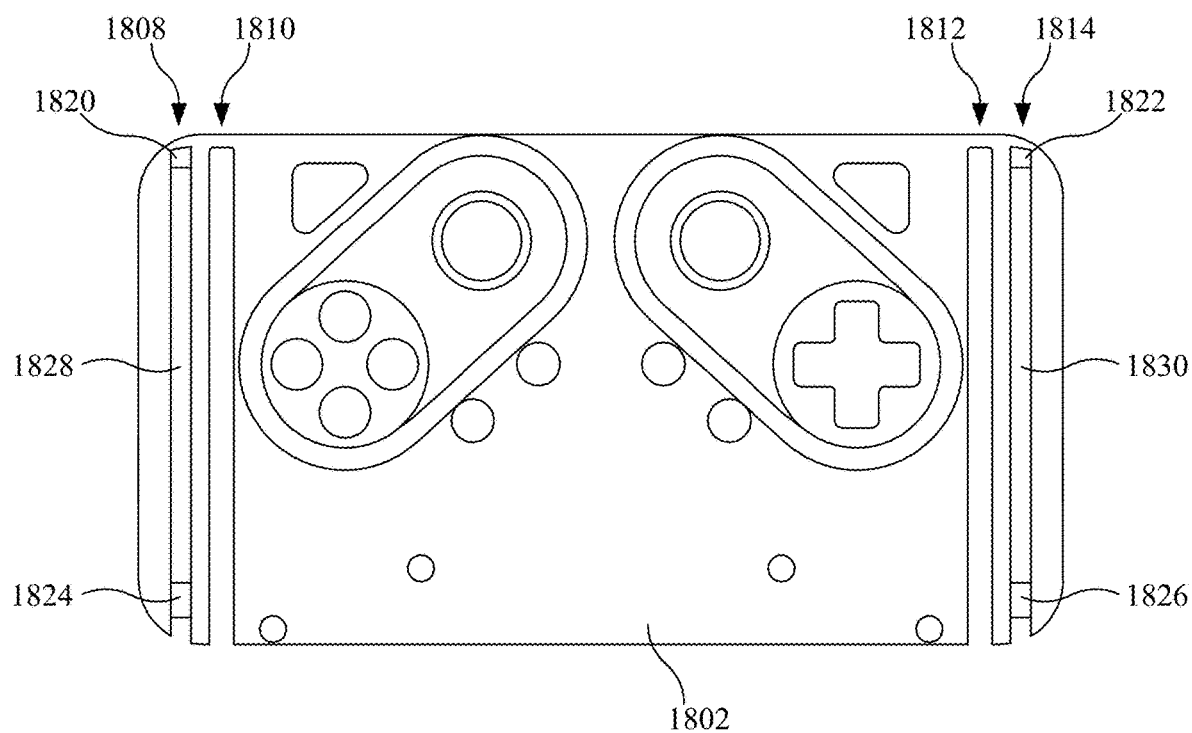
FIG. 18 is a top view of a lower case element according to another embodiment with a different sliding mechanism.

Referring first to FIG. 18, this figure depicts a top view of another embodiment of the lower case element 1802 including the game control elements described above. Some reference numerals are omitted from various elements to simplify the figure and this discussion, the focus being on the elements of lower case element 1802 which interact with elements of upper case element 1804 (shown in FIG. 19) to enable sliding, however, it will be appreciated that these elements operate in the same or a similar manner to corresponding elements from the previous embodiment. Therein, it can be seen that there are now two grooves fabricated within the lower case element 1802 on each side thereof, i.e., grooves 1808 and 1810 on the right side of the lower case element 1802 (the lower case element being inverted in FIG. 18) and grooves 1812 and 1814 on the left side of the lower case element 1802. Grooves 1810 and 1812 accommodate rails 1904 and 1902, respectively (shown in FIG. 19 and described below) in a manner similar to that described above with respect to FIG. 1 (i.e., rails 122, 124, and grooves 126 and 128). However, note that while grooves 1810 and 1812 have openings to the outside of the front of the lower case element 1802 (so that the upper case element 1804 can be completely slid out from the lower case element 1802), grooves 1810 and 1812 do not extend all the way to the rear of the lower case element 1802, i.e., the grooves 1802 and 1806 include their own rail stops to prevent the upper case element 1804 from inadvertently being slid out rearwardly.

Figure 19:
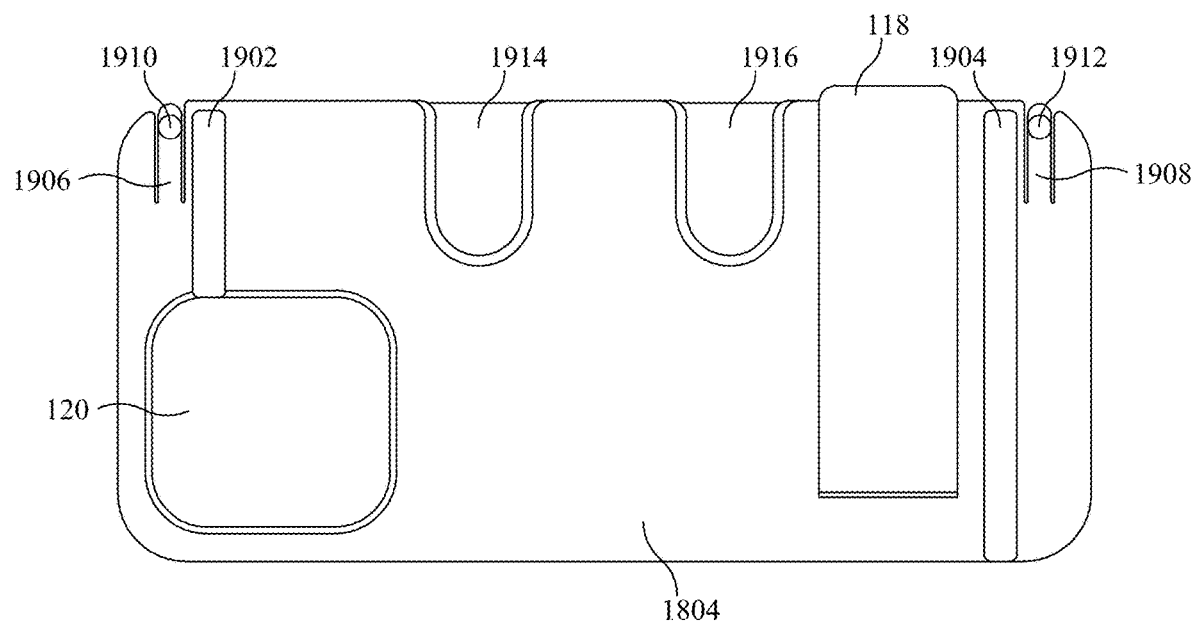
FIG. 19 is a bottom view of an upper case element according to the embodiment of FIG. 18.

Further note that, unlike the embodiment of FIGS. 1-16, and as best seen in FIG. 19, the spring release tabs 1906 and 1908 are disposed outwardly (i.e., toward the left and right sides of the upper case element 1904) of the rails 1902 and 1904, whereas, in the embodiment of FIGS. 1-16, the spring release tabs 130 are disposed inwardly relative to rails 122, 124. By locating the spring release tabs 130 outwardly relative to the rails 1902 and 1904, the spring force associated with the spring release tabs 130 has a lesser tendency to create bowing of the center portion of the upper case element 1804.

Returning to FIG. 18, the lower case element 1802 also includes two series, 1808 and 1814, of holes and grooves, which both enable the spring release tabs 1906 and 1908, respectively, to travel/slide alongside the rails 1902 and 1904 and also provide for retention of the upper case element 1804 in both the attached active configuration (open) position and the attached idle (closed) position. Specifically, each series 1808, 1814 includes a rear hole or divot 1820, 1822, a front hole or divot 1824, 1826, and a groove 1828, 1830 between the respective rear and front holes. In operation, and starting in the attached idle configuration (closed), the tips or extrusions 1910, 1912 formed on the spring release tabs 1906, 1908, respectively, are disposed in their respective rear hole or divot 1822, 1820. By pushing on the rear edge of the upper case element 1804 and/or pulling on the front edge of the upper case element 1804 with sufficient force, the user can dislodge the extrusions 1910, 1912 from their respective rear hole or divot 1822, 1820, whereupon they enter grooves 1828, 1830.

By applying force to the upper case element 1804, the upper case element will slide upward relative to the lower case element 1802, revealing the game control elements disposed in the lower case element. When the extrusions 1910, 1912 reach their respective front hole or divot 1826, 1824, they will fall into those holes to thereby firmly engage the gaming controller of this embodiment in the attached active configuration (open) with all of the gaming elements. The reverse of this process can be used to close the gaming controller, i.e., a user can push (and/or pull) the front edge of the upper case element 1904 with sufficient force to dislodge the extrusions 1910, 1912 from their respective front holes 1826, 1824, whereupon the spring release tabs 1906, 1908 will slide along grooves 1830, 1828 until reaching rear holes 1820, 1822 where the extrusions1912, 1910 will enter those holes to arrest the movement of the upper case element 102 in the attached idle configuration (closed).

When the extrusions 1910 and 1912 enter either the rear holes or the front holes, an audible clicking noise can be created when the release tabs 1906 and 1908 snap into place. The amount of force X1, X2 needed to move the spring release tabs 1906 and 1908 out of the front and rear holes, respectively (and thereby to move the upper case element 1904 out of the closed or open position) is greater than the amount of force Y needed to move the spring release tabs and their extrusions along the grooves 1830, 1828.

FIG. 19 also illustrates two shallow recesses 1914 and 1916 formed in the underside of upper case element 1804. These shallow recesses 1914, 1916 are formed in locations where the joysticks 108 and 110 are located relative to the upper case element 1804. This enables the overall gaming controller thickness to be further minimized since the joysticks 108 and 110 may be a thickness limiting factor due to their height relative to the other gaming controller elements. The recesses 1914 and 1916 are dimensioned to enable enough room for the tops of the joysticks when the game controller is fully closed and during the sliding operation until the joysticks are fully exposed.

Figure 20:
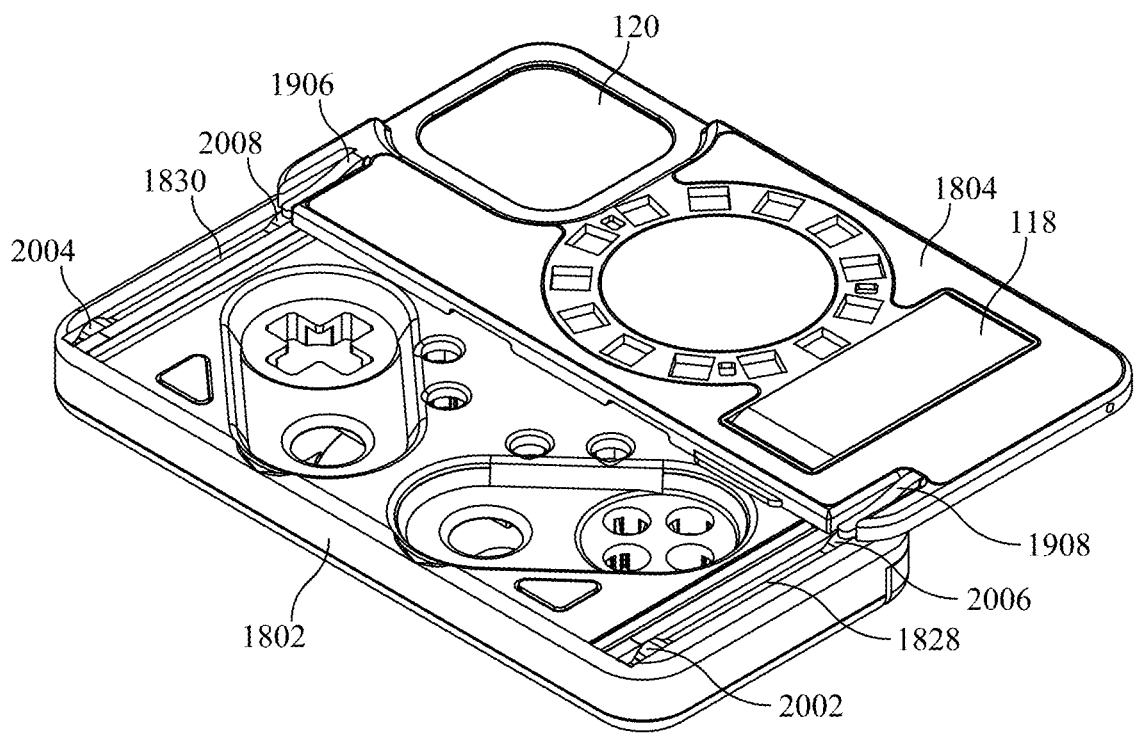
FIG. 20 is an isometric view of a gaming controller having a slide mechanism as described with respect to FIGS. 18 and 19.

Note also that, although not shown in FIGS. 18-20, this embodiment can also include the charging coil and associated circuitry described above with respect to the previous embodiment so as to enable the game controller to charge the attached phone.

FIG. 20 shows a gaming controller of the embodiments of FIGS. 18 and 19 in an isometric view in the open position. Therein, the interaction between the spring release tabs 1906, 1908 and their respective grooves 1830, 1828 can be seen. Also of interest in this figure are the walls (also referred to herein as "bump stops") 2002 and 2004, which separate the grooves 1828 and 1830 from their respective rear holes 1820 and 1822 (not seen in FIG. 20). Similarly, bump stops 2006 and 2008 separate grooves 1828 and 1830 from their respective front holes 1824 and 1826 (not seen in FIG. 20). More specifically, it can be seen that the walls 2002 and 2004 are sloped or tapered on each side to provide for a smoother (or less smooth) transition between engagement with the holes, disengagement from the holes, and entry into the grooves. Some more of the transitional aspects associated with moving the sliding mechanism between the open, closed, and detached states, including more details regarding the above-described tapers or slopes, according to this embodiment are described in more detail below with respect to FIGS. 21 and 22.

The slope or taper of the walls 2002, 2004 (and the other two walls hidden from view in FIG. 20), or stated differently, the bevel associated with their corresponding holes can have a profile which is designed to balance the firmness of the engagement of the extrusions within their respective holes with the amount of force which is needed to disengage the extrusions from their respective holes when the user wants to change the configuration position of the game controller from open to closed or closed to open. An example of such profiles is illustrated in FIGS. 21 and 22.

Figure 21:
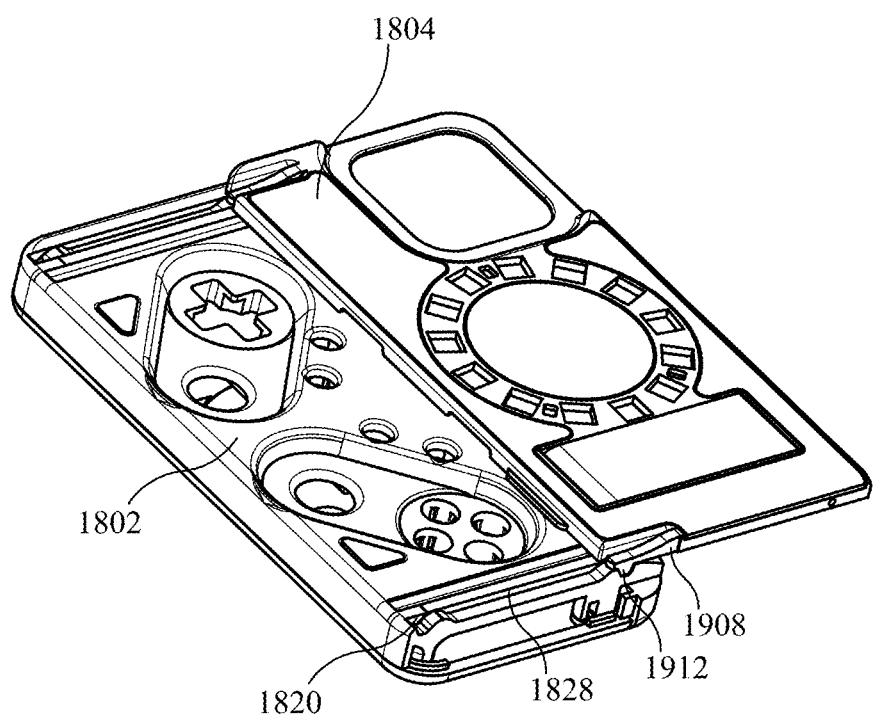
FIG. 21 is an isometric, side-revealed view of one side of the gaming controller, including a tip or protrusion and engagement holes, which are used to removably secure a sliding top element of the gaming controller of FIGS. 18-21 in the open position.

FIG. 21 shows an isometric view of a gaming controller according to the embodiment of FIGS. 18-20 with the upper case element 1804 in its attached active (open) configuration and with the side covers of the upper case element 1804 and lower case element 1802 removed to enable a view of the operation of relevant elements associated with the sliding mechanism. In this view, it can be seen that the extrusion 1912 is engaged with front hole 1824 to retain the upper case element 1804 and lower case element 1802 in their respective positions relative to one another (such that the gaming controller is in the open position) absent sufficient force in either direction to either disengage the upper case element 1804 from the lower case element 1802 entirely, i.e., by pushing or pulling the upper case element 1804 even further away from the lower case element, or to move the extrusion 1906 into the groove 1828, i.e., by pushing or pulling the upper case element 1804 toward the closed position. Although not visible in FIG. 21, the same is true on the opposite side of the controller, where extrusion 1910 is engaged with front hole 1826. In this embodiment, note that the extrusion 1906 has the same shape/profile as the front hole 1824.

Figure 22:
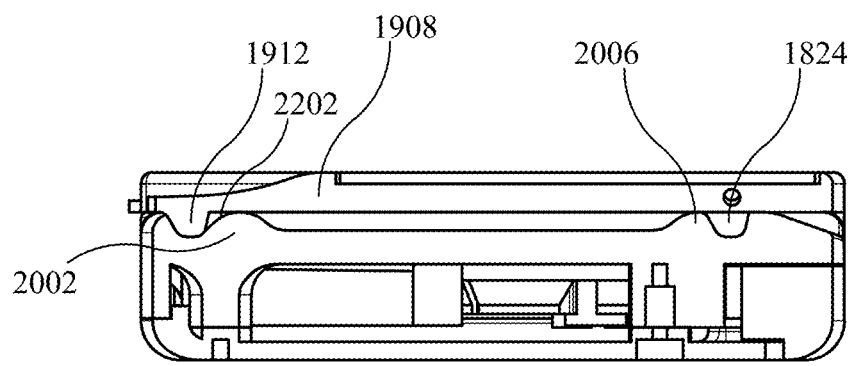
FIG. 22 is a side-revealing view of one side of the gaming controller, including an extrusion and engagement holes, which are used to removably secure a sliding top element of the gaming controller of FIGS. 18-22 in the closed position.

FIG. 22 shows a side view of the game controller of FIG. 21 in its attached idle (closed) configuration. Therein, the extrusion 1912 now resides in rear hole 1820, which releasably retains the upper case element 1804 and the lower case element 1802 in their respective positions (along with extrusion 1910 and rear hole 1822, not seen in FIG. 22). Note that, according to this embodiment, there is a gap 2202 between the extrusion 1912 and the bump or wall 2002 (unlike when in the open position described above with respect to FIG. 21). This gap 2202 is created because the profile of the bump stop 2002 includes a leading edge that slopes more gradually than the trailing edge of the bump stop 2006 in this embodiment. The reason why the profiles of the bump stops 2002 and 2004 are different (and, therefore, the profiles of the rear hole 1820 and front hole 1824 are also different) is because, in this embodiment, the sliding mechanism is designed so that the amount of force X1 needed to disengage the protrusion 1912 from the front hole 1824 (in both directions) is greater than the amount of force X2 needed to disengage the protrusion 1912 from the rear hole 1820, i.e., X1>X2>Y. Thus, according to this embodiment, it is easier for the user to start moving the upper case element 1804 out of the closed position than it is for the user to move the upper case element 1804 out of the open position. This intentional feature of this embodiment enables the user to more easily open the game controller up but more tightly retain the game controller in its open state so that the upper case element 1804 does not move or rattle while the user is playing a game on his or her mobile phone using the game control elements disposed in the lower case element 1802.

Other mechanisms could be used to enhance the sensory feedback experienced by the user in operating the controller between the open and closed states". However it will be appreciated that numerous variations of these features are contemplated by other embodiments. For example, although the profiles of the bump stops and retaining holes in the embodiment of FIG. 22 have arcuate sides, one or more of these surfaces could instead be linear. Moreover, the forces needed to disengage the spring release tabs (via their protrusions) from the rear and front holes could be the same, i.e., X1=X2.

Figure 23:
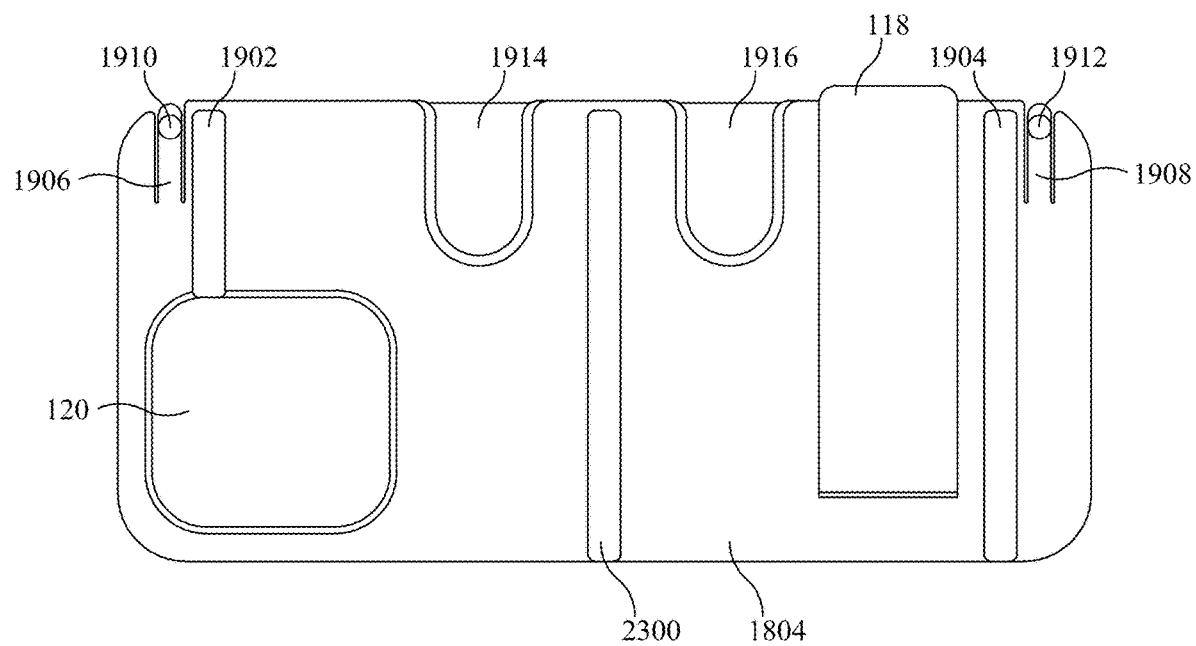
FIG. 23 is a bottom view of an upper case element, including a third rail associated with the sliding mechanism.
Figure 24:
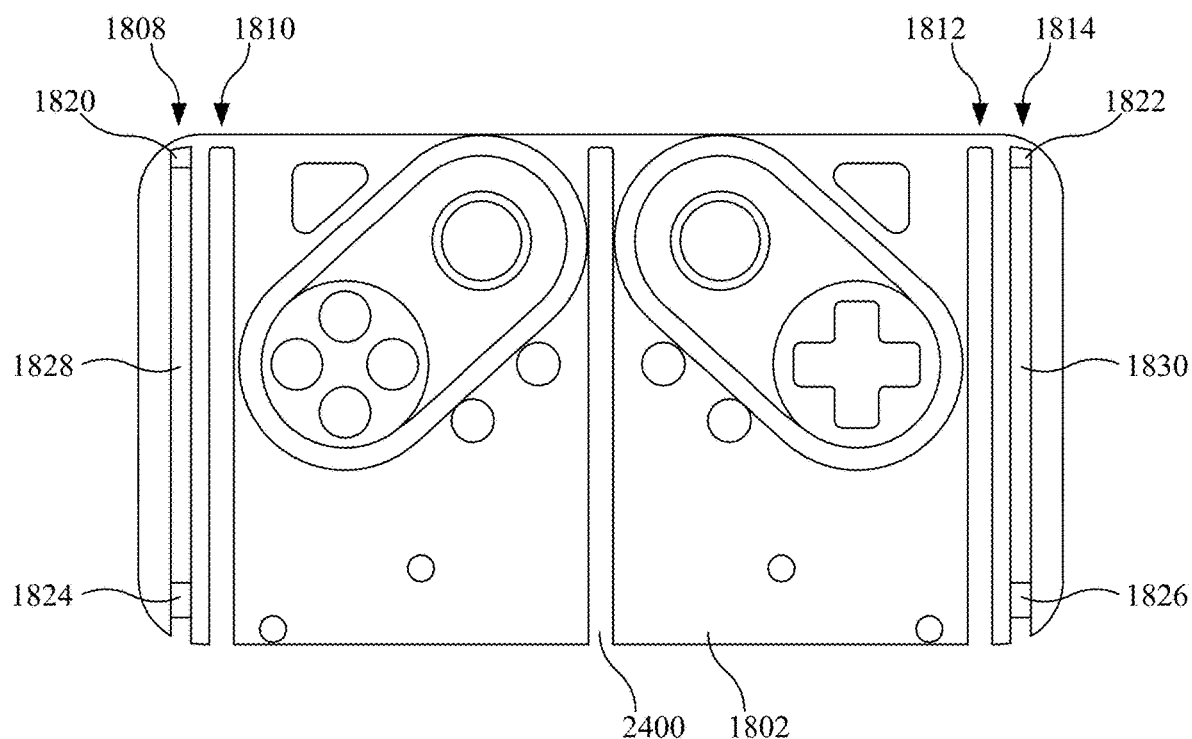
FIG. 24 is a top view of a lower case element, including a third groove associated with the sliding mechanism.

Other mechanisms could be used to make it easier to open the game controller when in its closed state. For example, the rear bump stops could be spring-loaded such that the rear bump stops retract as the protrusion begins to travel up the leading edge of the respective bump stop. As another example, a third, center rail 2300 (see in FIG. 23) and corresponding groove 2400 (see in FIG. 24) could also be added.

It should be understood that this description is not intended to limit the invention. On the contrary, the embodiments are intended to cover alternatives, modifications and equivalents, which are included in the spirit and scope of the invention. Further, in the detailed description of the embodiments, numerous specific details are set forth in order to provide a comprehensive understanding of the invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. An attachable accessory for a mobile phone comprising:
    a lower case element with a plurality of gaming controls disposed therein;
    an upper case element having one or more magnets configured to magnetically attach the mobile phone to the upper case element; and
    a sliding mechanism configured to couple the upper case element to the lower case element and enable the upper case element to slide along the lower case element between a closed position and an open position;
    wherein the upper case element has an opening that is positioned to accept a camera bump of the mobile phone; and
    wherein the sliding mechanism comprises at least two rails and at least two grooves, each of the rails configured to mate with a respective one of the grooves to enable sliding of the upper case element along the lower case element.

2. The accessory of claim 1, wherein the one or more magnets are MagSafe magnets.

3. The accessory of claim 1, wherein the opening in the upper case element is disposed to provide an opening for one or more camera elements disposed on the mobile phone.

4. The accessory of claim 1, wherein a first rail of the two rails extends substantially parallel to and along an entire side of the upper case element, and a second rail of the two rails extends substantially parallel to and along an opposite side of the upper case element until the second rail reaches the opening.

5. The accessory of claim 1, further comprising:
    a kickstand formed in the upper case element and operative between a closed position where the kickstand is flush with a surface of the upper case element and an open position where the kickstand is configured to support the upper case element at an angle relative to the lower case element.

6. The accessory of claim 1, wherein the upper case element and the lower case element have a length and width that are substantially the same length and width as the mobile phone.

7. The accessory of claim 1, wherein the upper case element is slidable between the closed position where the upper case element covers the lower case element, and the open position where the upper case element is slid away from the lower case element to expose the plurality of gaming control elements.

8. The accessory of claim 1, wherein the one or more magnets are disposed around a charging coil.

9. The accessory of claim 8, wherein the one or more magnets and the charging coil are disposed inside the upper case element.

10. The accessory of claim 8, wherein a conductive path between charging circuitry disposed in the lower case element and the charging coil disposed in the upper case element is established both in the closed position and the open position.

11. The accessory of claim 8, wherein a conductive path between charging circuitry disposed in the lower case element and the charging coil disposed in the upper case element is established only in the open position and not in closed position.

12. The accessory of claim 1, wherein the at least two rails include a third, centrally located rail.

13. The accessory of claim 1, wherein the sliding mechanism is further configured to enable the upper case element to slide along the lower case element and to fully disengage from the lower case element.

14. The accessory of claim 1, further comprising two releasable spring tabs disposed on the upper case element that engage with corresponding openings disposed, in the lower case element, at positions associated with the open position, wherein when the upper case element slides along the at least two grooves to a predetermined extent, the two releasable spring tabs enter the corresponding openings to hold the upper case element in the open position.

15. An attachable game controller for a mobile phone comprising:
    an upper case element having a plurality of magnets embedded therein configured to magnetically attach the upper case element with the mobile phone;
    a lower case element having a plurality of gaming control elements disposed therein; and
    a sliding mechanism configured to couple the upper case element to the lower case element and enable the upper case element to slide away from the lower case element from a closed position, wherein the upper case element covers most of the plurality of gaming control elements, to an open position where the plurality of gaming control elements are exposed; and
    further wherein the sliding mechanism is configured to enable the upper case element to fully disengage from the lower case element.

16. The game controller of claim 15, wherein the upper case element and lower case element have a length and width that are substantially the same length and width as the mobile phone.

17. The game controller of claim 15, wherein the plurality of magnets are MagSafe magnets.

18. The game controller of claim 15, further comprising:
    an opening in the upper case element disposed to align with one or more camera elements disposed on the mobile phone.

19. The game controller of claim 15, further comprising:
    at least two rails formed on a bottom surface of the upper case element;
    wherein a first rail of the at least two rails extends substantially parallel to and along an entire side of the upper case element, and a second rail of the at least two rails extends substantially parallel to and along an opposite side of the upper case element until the second rail reaches the opening.

20. The game controller of claim 15, further comprising:
    a kickstand operative between a closed position where the kickstand is flush with a surface of the upper case element and an open position where the kickstand is configured to support the upper case element at an angle relative to the lower case element.

21. The game controller of claim 15, wherein the upper case element is slidable between the closed position, where the upper case element covers the lower case element, and the open position where the upper case element is slid away from the lower case element to expose the plurality of gaming control elements.

22. The game controller of claim 15, wherein the plurality of magnets are disposed around a charging coil.

23. The game controller of claim 22, wherein the plurality of magnets and the charging coil are disposed inside the upper case element.

24. The game controller of claim 22, further comprising:
a battery disposed in the lower case element;
wherein a conductive path between the battery disposed in the lower case element and the charging coil disposed in the upper case element is established both in the closed position and the open position.

25. The game controller of claim 22, further comprising:
a battery disposed in the lower case element;
wherein a conductive path between the battery disposed in the lower case element and the charging coil disposed in the upper case element is established only in the open position and not in the closed position.

26. The game controller of claim 19, wherein the at least two rails include a third, centrally located rail.

27. The game controller of claim 15, further comprising two releasable spring tabs disposed on the upper case element that engage with corresponding openings disposed, in the lower case element, at positions associated with the open position, wherein when the upper case element slides, along at least two grooves formed in the lower case element, to a predetermined extent, the two releasable spring tabs enter the corresponding openings to hold the upper case element in the open position.

28. The accessory of claim 1, wherein the opening positioned to accept a camera bump of the mobile phone is a hole.

* * * * *